(12) United States Patent
Dutta

(10) Patent No.: US 11,743,365 B2
(45) Date of Patent: Aug. 29, 2023

(54) SUPPORTING ANY PROTOCOL OVER NETWORK VIRTUALIZATION

(71) Applicant: NOKIA SOLUTIONS AND NETWORKS OY, Espoo (FI)

(72) Inventor: Pranjal Kumar Dutta, Sunnyvale, CA (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 24 days.

(21) Appl. No.: 17/075,378

(22) Filed: Oct. 20, 2020

(65) Prior Publication Data

US 2022/0124181 A1 Apr. 21, 2022

(51) Int. Cl.
*H04L 69/18* (2022.01)
*H04L 12/46* (2006.01)
*H04L 69/325* (2022.01)

(52) U.S. Cl.
CPC .......... *H04L 69/18* (2013.01); *H04L 12/4633* (2013.01); *H04L 69/325* (2013.01); *H04L 2212/00* (2013.01)

(58) Field of Classification Search
CPC ... H04L 69/18; H04L 12/4633; H04L 69/325; H04L 2212/00
See application file for complete search history.

(56) References Cited

U.S. PATENT DOCUMENTS

| 8,750,105 | B2* | 6/2014 | Li | H04L 47/2441 |
| | | | | 370/395.42 |
| 10,949,244 | B2* | 3/2021 | Naveen | H04L 12/4633 |

(Continued)

FOREIGN PATENT DOCUMENTS

WO WO 2014/189723 A1 11/2014

OTHER PUBLICATIONS

Farinacci, D., et al., "Generic Routing Encapsulation (GRE)," Network Working Group, RFC 2784, Mar. 2000, 9 pages.
(Continued)

*Primary Examiner* — Mohamed A. Wasel
(74) *Attorney, Agent, or Firm* — Tong, Rea, Bentley & Kim, LLC

(57) ABSTRACT

Various example embodiments for supporting transport of various protocols over network virtualization technology are presented herein. Various example embodiments for supporting transport of various protocols over network virtualization technology may be configured to support transport of various protocols over network virtualization generic routing encapsulation. Various example embodiments for supporting transport of various protocols over network virtualization technology may be configured to support communication of a packet including a payload and a header of a network virtualization generic routing encapsulation protocol, wherein the payload is based on a protocol other than Ethernet. Various example embodiments for supporting transport of various protocols over network virtualization technology may be configured to support communication of a packet including a payload and a header of a network virtualization generic routing encapsulation protocol, wherein the payload is based on a protocol at a communication layer above a data link layer.

13 Claims, 20 Drawing Sheets

(56) References Cited

U.S. PATENT DOCUMENTS

| | | | | |
|---|---|---|---|---|
| 2013/0259060 | A1* | 10/2013 | Liu | H04L 12/4633 |
| | | | | 370/401 |
| 2014/0348167 | A1* | 11/2014 | Jain | H04L 41/344 |
| | | | | 370/392 |
| 2014/0351645 | A1* | 11/2014 | Jain | H04L 12/4633 |
| | | | | 714/37 |
| 2016/0212008 | A1* | 7/2016 | Jain | H04L 12/4641 |
| 2016/0261428 | A1* | 9/2016 | Song | H04L 45/745 |
| 2016/0323184 | A1* | 11/2016 | Li | H04L 12/28 |
| 2018/0109606 | A1* | 4/2018 | Alpert | H04L 45/16 |
| 2018/0212869 | A1* | 7/2018 | Wu | G06F 9/45558 |
| 2019/0319847 | A1* | 10/2019 | Nahar | G06F 9/45558 |

OTHER PUBLICATIONS

Garg, P., et al., "NVGRE: Network Virtualization Using Generic Routing Encapsulation," Independent Submission, RFC 7637, Sep. 2015, 17 pages.

Defense Advanced Research Projects Agency—Information Processing Techniques Office, "Internet Protocol, Darpa Internet Program, Protocol Specification," RFC 791, Sep. 1981, 49 pages.

Deering, S., et al., "Internet Protocol, Version 6 (IPv6) Specification," Network Working Group, RFC 2460, Dec. 1998, 39 pages.

Tilli, JM., et al., "Data Plane Protocols and Fragmentation for 5G," 2017 IEEE Conference on Standards for Communications and Networking (CSCN), Sep. 18, 2017, 7 pages.

European Search Report mailed in corresponding EP 21195104.1 dated Feb. 22, 2022, 10 pages.

* cited by examiner

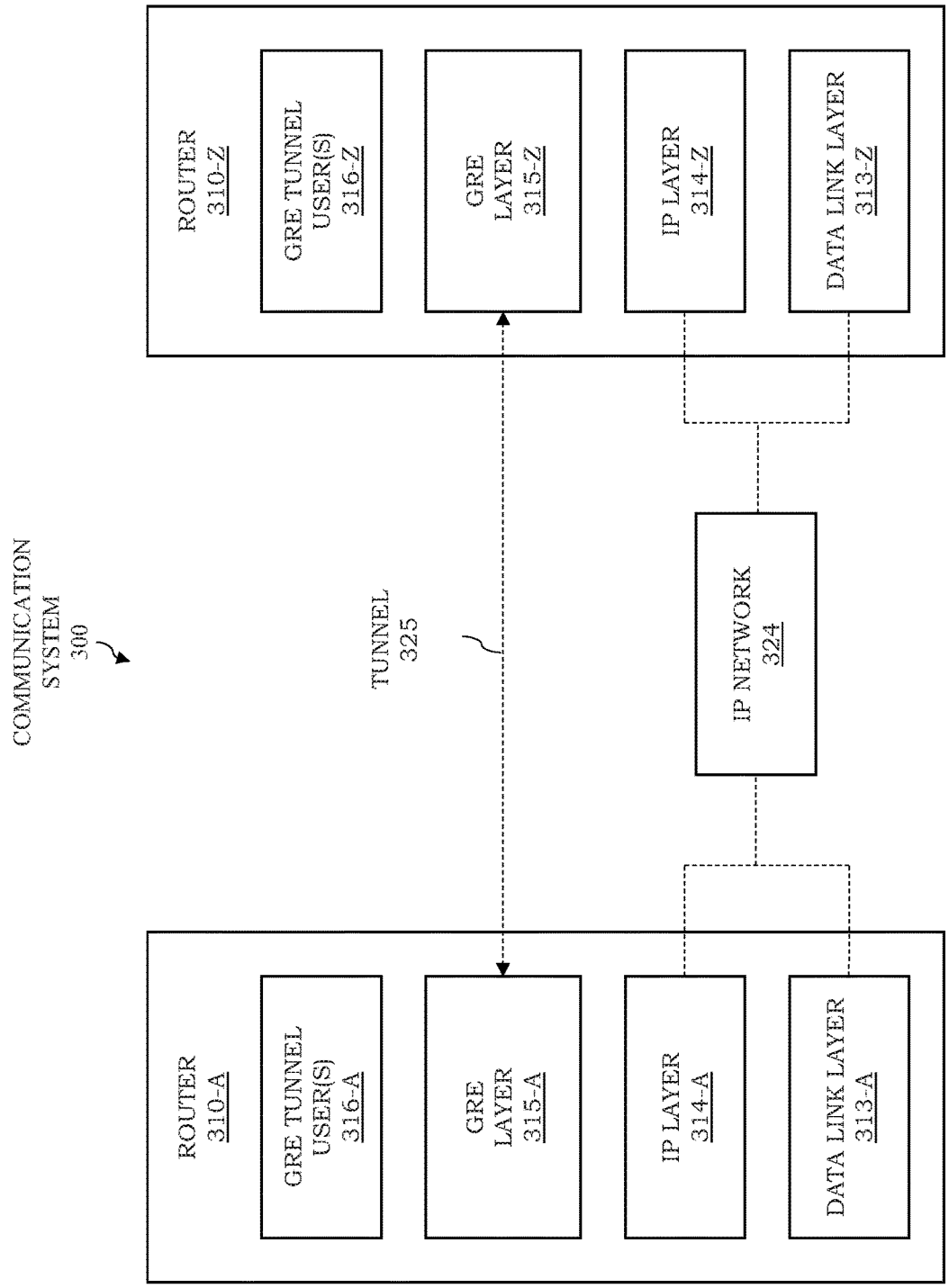

FIG. 4

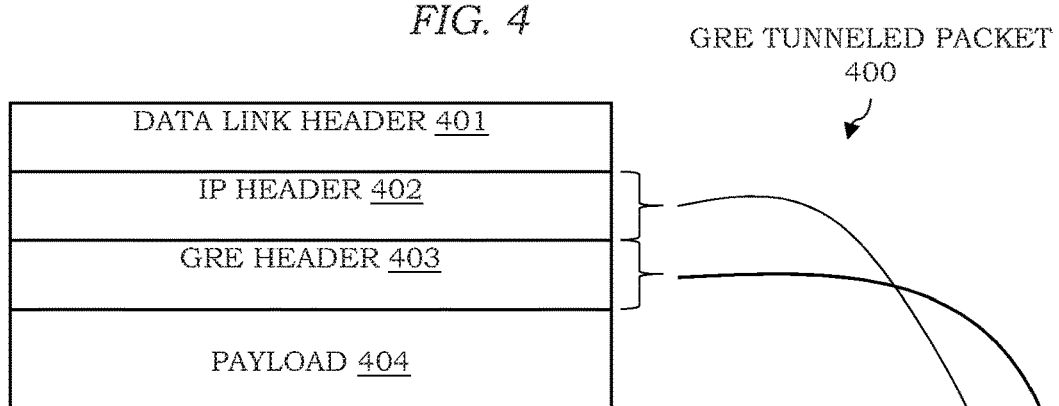

GRE TUNNELED PACKET 400

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Version|  IHL  |Type of Service|          Total Length         |
+-+-+-+-+-+-+-+-+-+-+-+-+-+-+-+-+-+-+-+-+-+-+-+-+-+-+-+-+-+-+-+-+
|         Identification        |Flags|      Fragment Offset    |
+-+-+-+-+-+-+-+-+-+-+-+-+-+-+-+-+-+-+-+-+-+-+-+-+-+-+-+-+-+-+-+-+
|  Time to Live |    Protocol   |         Header Checksum       |
+-+-+-+-+-+-+-+-+-+-+-+-+-+-+-+-+-+-+-+-+-+-+-+-+-+-+-+-+-+-+-+-+ IPv4
|                         Source Address                        |
+-+-+-+-+-+-+-+-+-+-+-+-+-+-+-+-+-+-+-+-+-+-+-+-+-+-+-+-+-+-+-+-+
|                      Destination Address                      |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+

+-+-+-+-+-+-+-+-+-+-+-+-+-+-+-+-+-+-+-+-+-+-+-+-+-+-+-+-+-+-+-+-+
|Version| Traffic Class |              Flow Label               |
+-+-+-+-+-+-+-+-+-+-+-+-+-+-+-+-+-+-+-+-+-+-+-+-+-+-+-+-+-+-+-+-+
|        Payload Length         |   Next Header |    Hop Limit  |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                         Source Address                        +
|                                                               | IPv6
+                                                               +
|                                                               |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                      Destination Address                      +
|                                                               |
+                                                               +
|                                                               |
+-+-+-+-+-+-+-+-+-+-+-+-+-+-+-+-+-+-+-+-+-+-+-+-+-+-+-+-+-+-+-+-+

0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|C|       Reserved0       | Ver |         Protocol Type         |
+-+-+-+-+-+-+-+-+-+-+-+-+-+-+-+-+-+-+-+-+-+-+-+-+-+-+-+-+-+-+-+-+
|      Checksum (optional)      |       Reserved1 (Optional)    |
+-+-+-+-+-+-+-+-+-+-+-+-+-+-+-+-+-+-+-+-+-+-+-+-+-+-+-+-+-+-+-+-+
```

FIG. 14

G-NVGRE-1
1400

```
+-+-+-+-+-+-+-+-+-+-+-+-+-+-+-+-+-+-+-+-+-+-+-+-+-+-+-+-+-+-+-+-+
|0| |1|0|   Reserved0      | Ver |   Protocol Type 0x6570        |
+-+-+-+-+-+-+-+-+-+-+-+-+-+-+-+-+-+-+-+-+-+-+-+-+-+-+-+-+-+-+-+-+
|           Virtual Subnet ID (VSID)          |     FlowID       |
+-+-+-+-+-+-+-+-+-+-+-+-+-+-+-+-+-+-+-+-+-+-+-+-+-+-+-+-+-+-+-+-+
```

FIG. 15

G-NVVGRE-2
1500

```
+-+-+-+-+-+-+-+-+-+-+-+-+-+-+-+-+-+-+-+-+-+-+-+-+-+-+-+-+-+-+-+-+
|0| |1|0|   Reserved0      | Ver |   Protocol Type 0x6572        |
+-+-+-+-+-+-+-+-+-+-+-+-+-+-+-+-+-+-+-+-+-+-+-+-+-+-+-+-+-+-+-+-+
|           Virtual Subnet ID (VSID)          |     FlowID       |
+-+-+-+-+-+-+-+-+-+-+-+-+-+-+-+-+-+-+-+-+-+-+-+-+-+-+-+-+-+-+-+-+
|   Upper Layer Protocol Type    |
+-+-+-+-+-+-+-+-+-+-+-+-+-+-+-+-+
```

SUPPORTING ANY PROTOCOL OVER NETWORK VIRTUALIZATION

TECHNICAL FIELD

Various example embodiments relate generally to communication systems and, more particularly but not exclusively, to supporting multiple protocols over network virtualization protocols.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to support communication of a packet including a payload and a header of a network virtualization generic routing encapsulation protocol, wherein the payload is based on a protocol at a communication layer above a data link layer. In at least some example embodiments, the header includes a protocol type field, a virtual subnet identifier field, and a flow identifier field. In at least some example embodiments, the protocol at the communication layer above the data link layer includes a non-standard protocol of a networking stack. In at least some example embodiments, the protocol at the communication layer above the data link layer includes at least one of a switch fabric protocol or an inter-card communication protocol. In at least some example embodiments, an indication of the protocol at the communication layer above the data link layer is not encoded within the header. In at least some example embodiments, the protocol at the communication layer above the data link layer is negotiated using at least one of an out-of-band mechanism or a manual configuration operation. In at least some example embodiments, the header includes a protocol type field, a virtual subnet identifier field, a flow identifier field, and an upper layer protocol type field, and the upper layer protocol field indicates a payload type of the payload. In at least some example embodiments, the protocol at the communication layer above the data link layer includes a standard protocol of a networking stack. In at least some example embodiments, the protocol at the communication layer above the data link layer includes at least one of Internet Protocol (IP), Fibre Channel (FC), Infiband, Peripheral Component Interconnect Express (PCIe), or Non-Volatile Memory Express (NVMe). In at least some example embodiments, the upper layer protocol type field is configured to encode an indication of the protocol at the communication layer above the data link layer. In at least some example embodiments, the upper layer protocol type field is configured to encode an Ethertype value of a payload protocol type of the protocol type field. In at least some example embodiments, the packet further includes a network layer header on top of the header of the network virtualization generic routing encapsulation protocol. In at least some example embodiments, the network layer header is an Internet Protocol (IP) header. In at least some example embodiments, a protocol type field in the IP header includes a value indicative of a Generic Routing Encapsulation (GRE) protocol.

In at least some example embodiments, a non-transitory computer-readable medium stores a set of instructions configured to cause an apparatus to support communication of a packet including a payload and a header of a network virtualization generic routing encapsulation protocol, wherein the payload is based on a protocol at a communication layer above a data link layer. In at least some example embodiments, the header includes a protocol type field, a virtual subnet identifier field, and a flow identifier field. In at least some example embodiments, the protocol at the communication layer above the data link layer includes a non-standard protocol of a networking stack. In at least some example embodiments, the protocol at the communication layer above the data link layer includes at least one of a switch fabric protocol or an inter-card communication protocol. In at least some example embodiments, an indication of the protocol at the communication layer above the data link layer is not encoded within the header. In at least some example embodiments, the protocol at the communication layer above the data link layer is negotiated using at least one of an out-of-band mechanism or a manual configuration operation. In at least some example embodiments, the header includes a protocol type field, a virtual subnet identifier field, a flow identifier field, and an upper layer protocol type field, and the upper layer protocol field indicates a payload type of the payload. In at least some example embodiments, the protocol at the communication layer above the data link layer includes a standard protocol of a networking stack. In at least some example embodiments, the protocol at the communication layer above the data link layer includes at least one of Internet Protocol (IP), Fibre Channel (FC), Infiband, Peripheral Component Interconnect Express (PCIe), or Non-Volatile Memory Express (NVMe). In at least some example embodiments, the upper layer protocol type field is configured to encode an indication of the protocol at the communication layer above the data link layer. In at least some example embodiments, the upper layer protocol type field is configured to encode an Ethertype value of a payload protocol type of the protocol type field. In at least some example embodiments, the packet further includes a network layer header on top of the header of the network virtualization generic routing encapsulation protocol. In at least some example embodiments, the network layer header is an Internet Protocol (IP) header. In at least some example embodiments, a protocol type field in the IP header includes a value indicative of a Generic Routing Encapsulation (GRE) protocol.

In at least some example embodiments, a method includes supporting communication of a packet including a payload and a header of a network virtualization generic routing encapsulation protocol, wherein the payload is based on a protocol at a communication layer above a data link layer. In at least some example embodiments, the header includes a protocol type field, a virtual subnet identifier field, and a flow identifier field. In at least some example embodiments, the protocol at the communication layer above the data link layer includes a non-standard protocol of a networking stack. In at least some example embodiments, the protocol at the communication layer above the data link layer includes at least one of a switch fabric protocol or an inter-card communication protocol. In at least some example embodiments, an indication of the protocol at the communication layer above the data link layer is not encoded within the header. In at least some example embodiments, the protocol at the communication layer above the data link layer is negotiated using at least one of an out-of-band mechanism or a manual configuration operation. In at least some example embodiments, the header includes a protocol type field, a virtual subnet identifier field, a flow identifier field, and an upper layer protocol type field, and the upper layer protocol field indicates a payload type of the payload. In at least some example embodiments, the protocol at the communication layer above the data link layer includes a standard protocol of a networking stack. In at least some example embodiments, the protocol at the communication layer above the data link layer includes at least one of Internet Protocol (IP), Fibre Channel (FC), Infiband, Peripheral Component Interconnect Express (PCIe), or Non-Volatile Memory Express (NVMe). In at least some example embodiments, the upper layer protocol type field is configured to encode an indication of the protocol at the communication layer above the data link layer. In at least some example embodiments, the upper layer protocol type field is configured to encode an Ethertype value of a payload protocol type of the protocol type field. In at least some example embodiments, the packet further includes a network layer header on top of the header of the network virtualization generic routing encapsulation protocol. In at least some example embodiments, the network layer header is an Internet Protocol (IP) header. In at least some example embodiments, a protocol type field in the IP header includes a value indicative of a Generic Routing Encapsulation (GRE) protocol.

In at least some example embodiments, an apparatus includes means for supporting communication of a packet including a payload and a header of a network virtualization generic routing encapsulation protocol, wherein the payload is based on a protocol at a communication layer above a data link layer. In at least some example embodiments, the header includes a protocol type field, a virtual subnet identifier field, and a flow identifier field. In at least some example embodiments, the protocol at the communication layer above the data link layer includes a non-standard protocol of a networking stack. In at least some example embodiments, the protocol at the communication layer above the data link layer includes at least one of a switch fabric protocol or an inter-card communication protocol. In at least some example embodiments, an indication of the protocol at the communication layer above the data link layer is not encoded within the header. In at least some example embodiments, the protocol at the communication layer above the data link layer is negotiated using at least one of an out-of-band mechanism or a manual configuration operation. In at least some example embodiments, the header includes a protocol type field, a virtual subnet identifier field, a flow identifier field, and an upper layer protocol type field, and the upper layer protocol field indicates a payload type of the payload. In at least some example embodiments, the protocol at the communication layer above the data link layer includes a standard protocol of a networking stack. In at least some example embodiments, the protocol at the communication layer above the data link layer includes at least one of Internet Protocol (IP), Fibre Channel (FC), Infiband, Peripheral Component Interconnect Express (PCIe), or Non-Volatile Memory Express (NVMe). In at least some example embodiments, the upper layer protocol type field is configured to encode an indication of the protocol at the communication layer above the data link layer. In at least some example embodiments, the upper layer protocol type field is configured to encode an Ethertype value of a payload protocol type of the protocol type field. In at least some example embodiments, the packet further includes a network layer header on top of the header of the network virtualization generic routing encapsulation protocol. In at least some example embodiments, the network layer header is an Internet Protocol (IP) header. In at least some example embodiments, a protocol type field in the IP header includes a value indicative of a Generic Routing Encapsulation (GRE) protocol.

In at least some example embodiments, an apparatus includes at least one processor and at least one memory including a set of instructions, wherein the set of instructions is configured to, when executed by the at least one processor, cause the apparatus to support communication of a packet including a payload and a header of a network virtualization generic routing encapsulation protocol, wherein the payload is based on a protocol other than Ethernet. In at least some example embodiments, the protocol other than Ethernet includes a protocol of a networking stack. In at least some example embodiments, the protocol other than Ethernet includes a custom protocol. In at least some example embodiments, the custom protocol includes at least one of a switch fabric protocol or an inter-card communication protocol. In at least some example embodiments, an indication of the protocol at the communication layer above the data link layer is not encoded within the header.

In at least some example embodiments, a non-transitory computer-readable medium stores a set of instructions configured to cause an apparatus to support communication of a packet including a payload and a header of a network virtualization generic routing encapsulation protocol, wherein the payload is based on a protocol other than Ethernet. In at least some example embodiments, the protocol other than Ethernet includes a protocol of a networking stack. In at least some example embodiments, the protocol other than Ethernet includes a custom protocol. In at least some example embodiments, the custom protocol includes at least one of a switch fabric protocol or an inter-card communication protocol. In at least some example embodiments, an indication of the protocol at the communication layer above the data link layer is not encoded within the header.

In at least some example embodiments, a method includes supporting communication of a packet including a payload and a header of a network virtualization generic routing encapsulation protocol, wherein the payload is based on a protocol other than Ethernet. In at least some example embodiments, the protocol other than Ethernet includes a protocol of a networking stack. In at least some example embodiments, the protocol other than Ethernet includes a custom protocol. In at least some example embodiments, the custom protocol includes at least one of a switch fabric protocol or an inter-card communication protocol. In at least some example embodiments, an indication of the protocol at the communication layer above the data link layer is not encoded within the header.

In at least some example embodiments, an apparatus includes means for supporting communication of a packet including a payload and a header of a network virtualization generic routing encapsulation protocol, wherein the payload is based on a protocol other than Ethernet. In at least some example embodiments, the protocol other than Ethernet includes a protocol of a networking stack. In at least some example embodiments, the protocol other than Ethernet includes a custom protocol. In at least some example embodiments, the custom protocol includes at least one of a switch fabric protocol or an inter-card communication protocol. In at least some example embodiments, an indication of the protocol at the communication layer above the data link layer is not encoded within the header.

BRIEF DESCRIPTION OF THE DRAWINGS

The teachings herein can be readily understood by considering the following detailed description in conjunction with the accompanying drawings, in which:

FIG. 3 depicts an example embodiment of a communication system configured to support GRE-based tunneling;

FIG. 4 depicts an example embodiment of a GRE tunneled packet which may be sent over a GRE tunnel;

FIG. 14 depicts an example embodiment of the encoding of a G-NVGRE-1 header for supporting transport of any protocol over NVGRE;

FIG. 15 depicts an example embodiment of the encoding of a G-NVGRE-2 header for supporting transport of any protocol over NVGRE;

To facilitate understanding, identical reference numerals have been used herein, wherever possible, in order to designate identical elements that are common among the various figures.

DETAILED DESCRIPTION

Various example embodiments for supporting transport of various protocols over network virtualization technology are presented herein. Various example embodiments for supporting transport of various protocols over network virtualization technology may be configured to support transport of various protocols over network virtualization generic routing encapsulation (NVGRE). Various example embodiments for supporting transport of various protocols over network virtualization technology may be configured to support communication of a packet including a payload and a header of a network virtualization generic routing encapsulation protocol, wherein the payload is based on a communication protocol other than Ethernet. Various example embodiments for supporting transport of various protocols over network virtualization technology may be configured to support communication of a packet including a payload and a header of a network virtualization generic routing encapsulation protocol, wherein the payload is based on a protocol at a communication layer above a data link layer. It will be appreciated that these and various other example embodiments and advantages or potential advantages of supporting transport of multiple protocols over network virtualization technology may be further understood by way of reference to the various figures, which are discussed further below.

Figure 1:
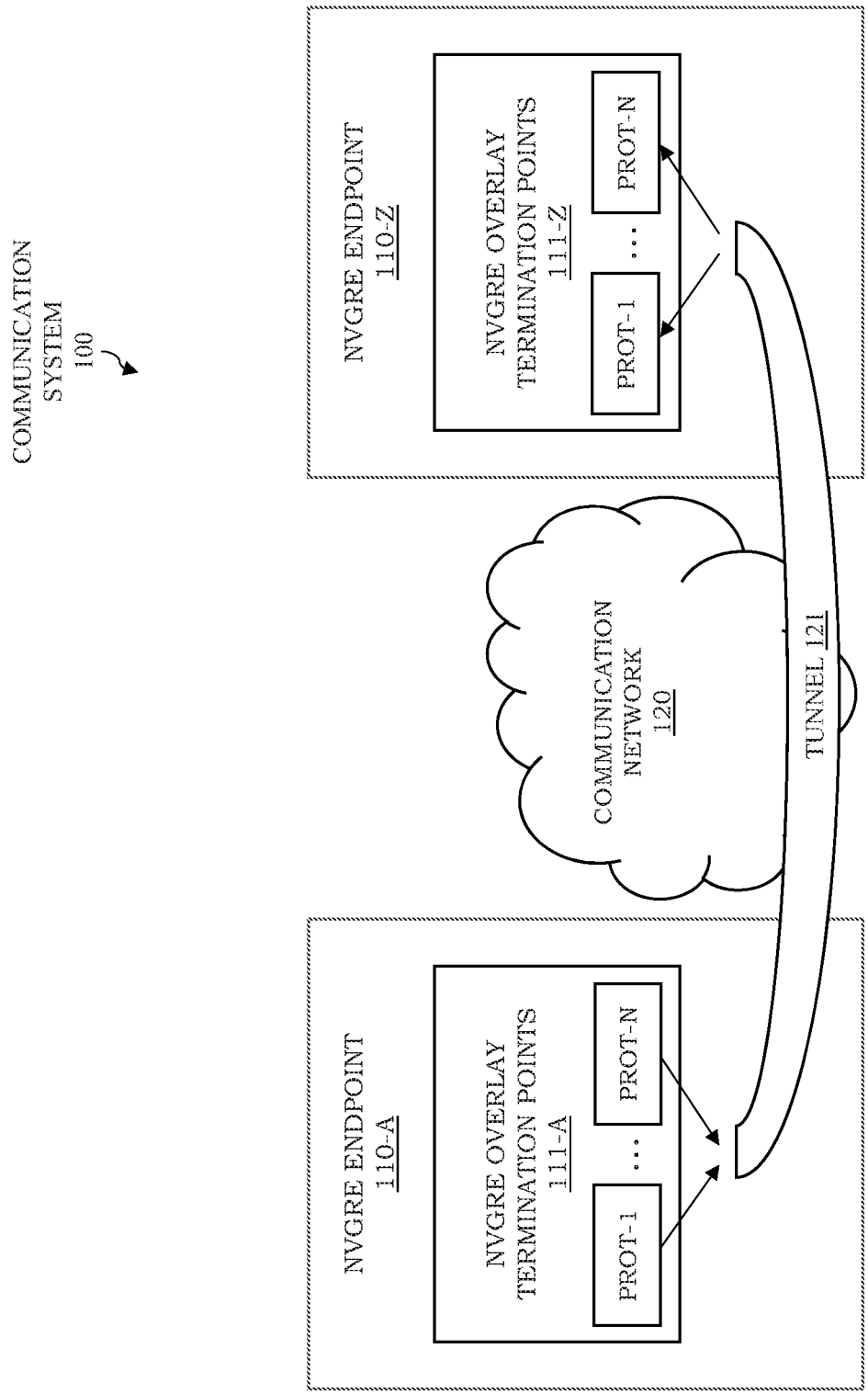
FIG. 1 depicts an example embodiment of a communication system configured to support transport of any protocol over network virtualization generic routing encapsulation (NVGRE) technology.

FIG. 1 depicts an example embodiment of a communication system configured to support transport of any protocol over network virtualization generic routing encapsulation (NVGRE) technology.

The communication system 100 includes a pair of NVGRE endpoints 110 configured to communicate over a communication network 120.

The NVGRE endpoints 110 may be routers, servers supporting virtual machines (VMs), hypervisors in servers supporting VMs, or the like. The NVGRE endpoints 110 includes an NVGRE endpoint 110-A and an NVGRE endpoint 110-Z. The NVGRE endpoint 110-A and the NVGRE endpoint 110-Z are configured to support a set of NVGRE overlays between pairs of NVGRE overlay termination points 111 supported by the NVGRE endpoint 110 (illustratively, between NVGRE overlay termination points 111-A on NVGRE endpoint 110-A and NVGRE overlay termination points 111-Z on NVGRE endpoint 110-Z). The NVGRE overlays between the NVGRE termination points 111 on the NVGRE endpoints 110 may be configured to support transport of packets of various protocols (represented in FIG. 1 by the depiction of N different pairs of NVGRE overlay termination points 111 associated with N different protocols, labeled PROT-1 through PROT-N, which may be supported). The NVGRE overlays between the NVGRE termination points 111 on the NVGRE endpoints 110 may be supported by a tunnel 121 over the communication network 120 (e.g., where the communication network 120 is an IP network and the tunnel 121 may be an underlay IP tunnel; however, it will be appreciated that various other types of tunnels may be supported).

The NVGRE endpoints 110, including the NVGRE overlay termination points 111 and the NVGRE overlays between the NVGRE termination points 111 on the NVGRE endpoints 110, may be configured to support communication of packets of any communication protocol. The NVGRE endpoint 110 may be configured to support communication of packets of protocols at various layers of the Open Systems Interconnection (OSI) model, protocols at various layers of the Transmission Control Protocol (TCP)/Internet Protocol (IP) suite, custom protocols, or the like, as well as various combinations thereof. The NVGRE endpoints 110 may be configured to support communication of packets of any communication protocol (including Ethernet and/or communication protocols other than Ethernet). The NVGRE endpoints 110 may be configured to support communication of packets of any communication protocol operating above the data link layer of the OSI model. The NVGRE endpoints 110 may be configured to support communication of packets of various other protocols which may be used between NVGRE endpoints.

It is noted that support for use of NVGRE overlays to transport packets of various protocols may be further understood by first considering various aspects of NVGRE as well as various contexts in which NVGRE overlays may be used to transport packets of various protocols.

GRE is an IP based tunneling mechanism, which means that GRE is a layer atop IP. GRE based tunneling is standardized and GRE can tunnel any protocol packet transparently over the IP network between two remote endpoints. GRE-based tunneling may be further understood by way of reference to FIGS. 2-4. NVGRE is an extension of GRE tunneling that allows two remote routers to multiplex a set of independent Ethernet networks (called overlay Ethernet networks) over a GRE tunnel, wherein the routers are separated by an IP network (the underlay). NVGRE-based tunneling may be further understood by way of reference to FIGS. 5-7 and various context in which NVGRE-based tunneling may be utilized may be further understood by way of reference to FIGS. 8-13.

Figure 2:
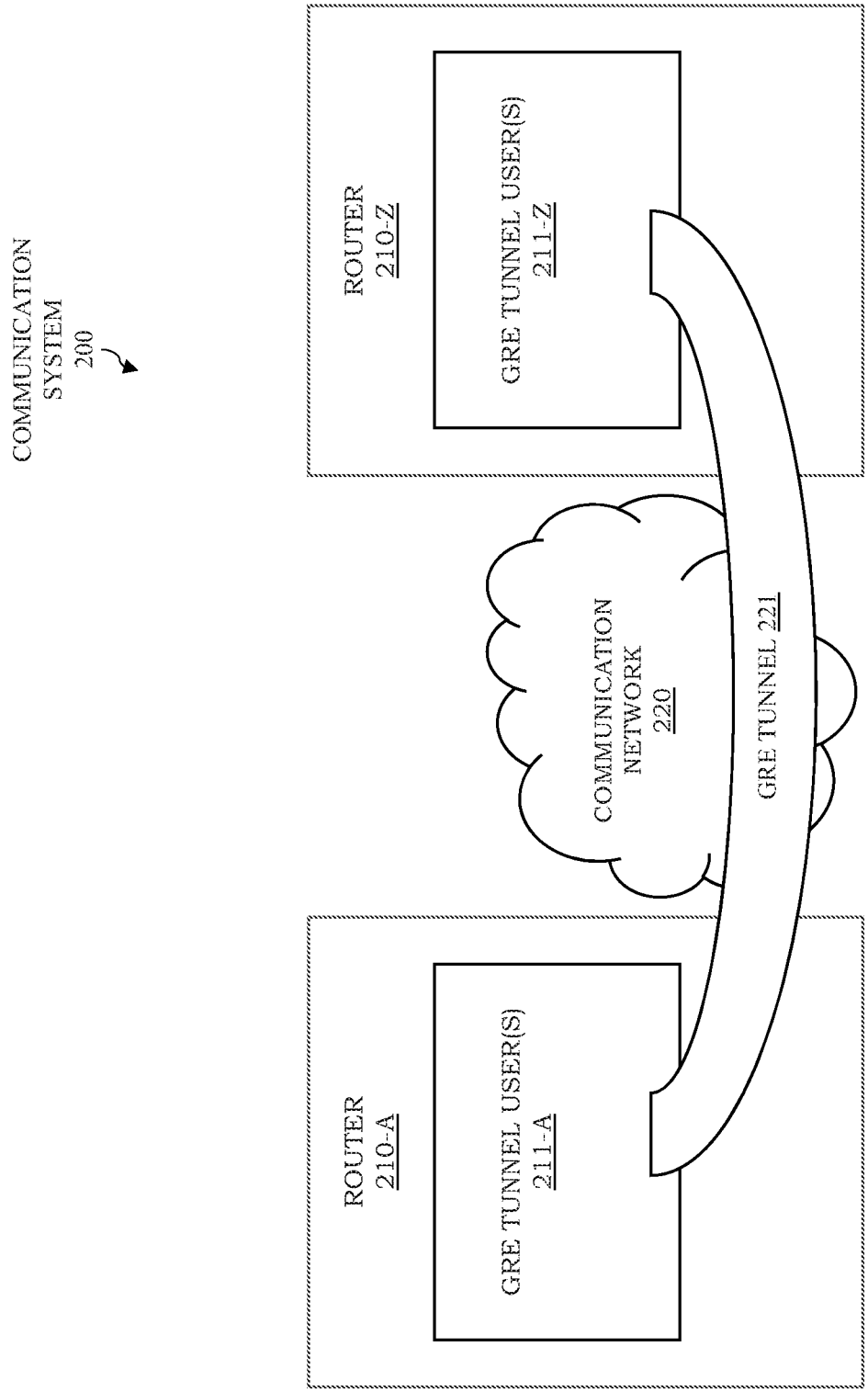
FIG. 2 depicts an example embodiment of a communication system configured to support GRE-based tunneling.

FIG. 2 depicts an example embodiment of a communication system configured to support GRE-based tunneling. The communication system 200 includes a pair of routers 210 configured to communicate over a communication network 220. The pair of routers 210 includes a router 210-A and a router 210-Z. The router 210-A and the router 210-Z are configured to support connections between pairs of GRE tunnel users 211 supported by the routers 210 (illustratively, between GRE tunnel users 211-A on router 210-A and GRE tunnel users 211-Z on router 210-Z). The routers 210 are not directly connected so the routers 210 set up the connections over a GRE tunnel 221 between the routers 210. The routers 210 are each configured with at least one IP address, which is used as a source or destination address by the IP underlay. The layers involved in GRE tunneling between the routers 210 are depicted in FIG. 3.

FIG. 3 depicts an example embodiment of a communication system configured to support GRE-based tunneling. The communication system 300 includes a pair of routers 310, including a router 310-A and a router 310-Z (collectively, routers 310) and an IP network 324 configured to support communications between the routers 310. The routers 310 support a data link layer 313 (illustratively, based on a data link layer 313-A on router 310-A and a data link layer 313-Z on router 310-Z), an IP layer 314 above the data link layer 313 (illustratively, based on an IP layer 314-A on router 310-A and an IP layer 314-Z on router 310-Z), a GRE layer 315 above the IP layer 314 (illustratively, based on a GRE layer 315-A on router 310-A and a GRE layer 315-Z on router 310-Z), and an GRE tunnel users 316 above the GRE layer 315 (illustratively, GRE tunnel users 316-A supported on router 310-A and GRE tunnel users 316-Z supported on router 310-Z). The data link layer 313, IP layer 314, GRE layer 315, and GRE tunnel users 316 on the routers 310, respectively, may form all or part of the communication protocol stacks configured on the routers 310 (e.g., based on the Open Systems Interconnection (OSI) model or one or more other suitable communication protocol stack models), respectively. The routers 310 are configured to provide a tunnel 325 based on the GRE layer 315, where it will be appreciated that the tunnel 325 is a connectionless, unreliable tunnel. It is noted that the format of a GRE tunneled packet is presented in FIG. 4.

FIG. 4 depicts an example embodiment of a GRE tunneled packet which may be sent over a GRE tunnel.

The GRE tunneled packet 400 includes a data link header 401, an IP header 402, a GRE header 403, and a payload 404.

The data link header 401 is the link layer header to reach the immediate next-hop in the IP network. For example, for an Ethernet link from the router to the IP next-hop, this header will be the Ethernet Header.

The IP header 402 includes an IPv4 datagram header or an IPv6 datagram header. The source and destination addresses are set to addresses of the source and destination routers in the IP underlay, respectively. The IPv4 Protocol Number field or the IPv6 Next Header field in 402 is set to 47, indicating a GRE packet as the payload of IP.

The GRE header 403 includes the Protocol Type field that is set to the Ethertype value indicating the type of payload, i.e., the packet from the user of the GRE tunnel.

The payload 404 includes the packet from the user of the tunnel, and may be of any type (e.g., Ethernet, IPv4, IPv6, MPLS, or the like) where the type is indicated by the Protocol Type field in GRE header 403.

It will be appreciated that this encapsulation causes user packets to be sent through the GRE tunnels. When the receiving endpoint of the tunnel receives a packet, it decapsulates the user packet by removing the IP and the GRE headers. The packet is then processed by the appropriate user application based on the Protocol Type specified in GRE header 303.

Figure 5:
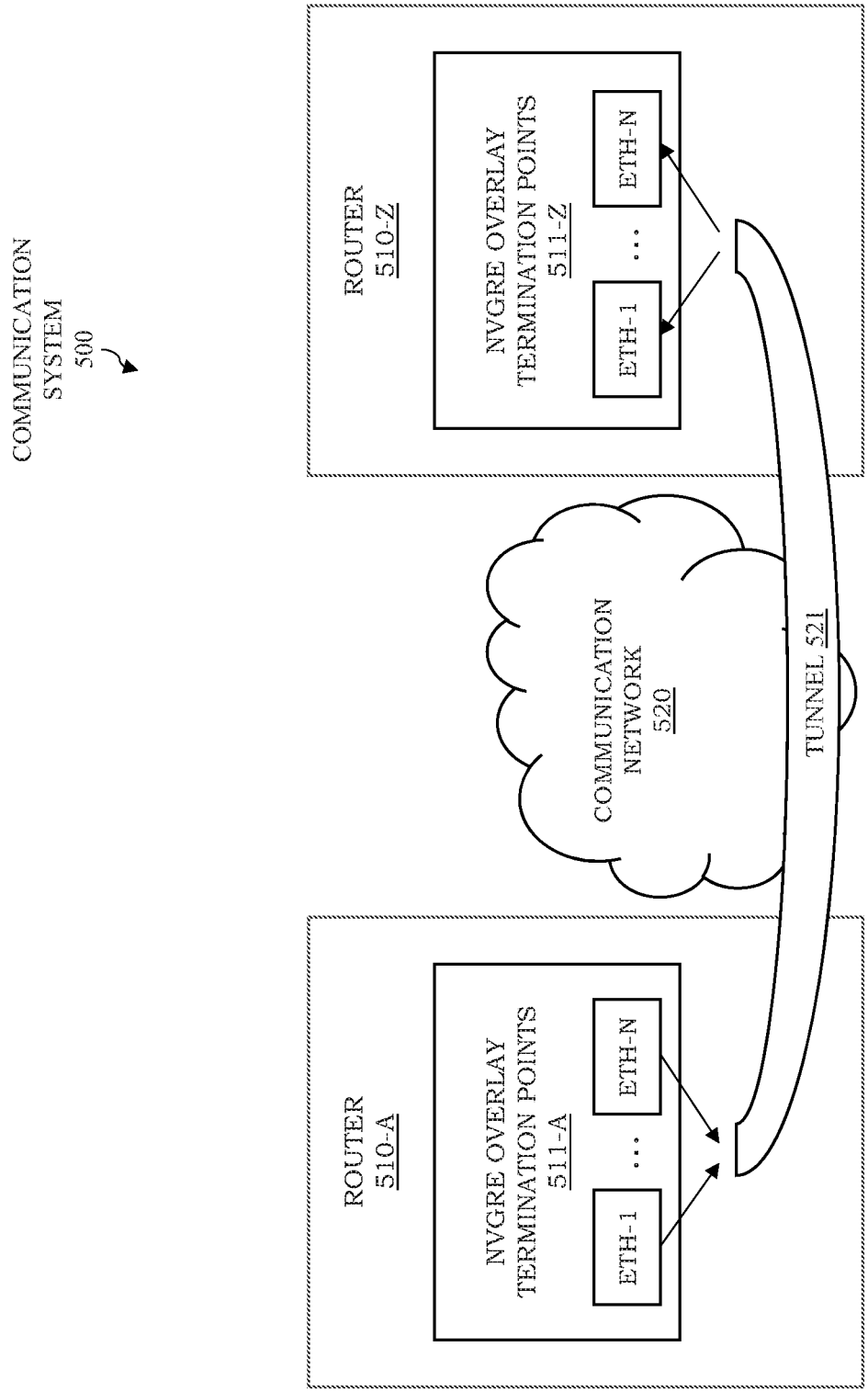
FIG. 5 depicts an example embodiment of a communication system configured to support NVGRE-based overlays.

FIG. 5 depicts an example embodiment of a communication system configured to support NVGRE-based overlays. The communication system 500 includes a pair of routers 510 configured to communicate over a communication network 520. The pair of routers 510 includes a router 510-A and a router 510-Z. The router 510-A and the router 510-Z are configured to support a set of Ethernet overlays between pairs of NVGRE overlay termination points 511 supported by the routers 510 (illustratively, between NVGRE overlay termination points 511-A on router 510-A and NVGRE overlay termination points 511-Z on router 510-Z). The Ethernet overlays between the NVGRE termination points 511 on the routers 510 may be configured to support transport of packets of various Ethernet overlays (represented in FIG. 5 by the depiction of N different pairs of Ethernet overlays, labeled ETH-1 through ETH-N, which may be supported). The Ethernet overlays between the NVGRE termination points 511 on the routers 510 may be supported by a tunnel 521 over the communication network 520 (e.g., where the communication network 520 is an IP network and the tunnel 521 may be an underlay IP tunnel; however, it will be appreciated that various other types of tunnels may be supported). It is noted that, since the routers 510 are not adjacent to each other, the routers 510 multiplex the NVGRE-based Ethernet overlays over a single IP underlay tunnel between them. The layers involved in NVGRE tunneling between the routers 510 are depicted in FIG. 6.

Figure 6:
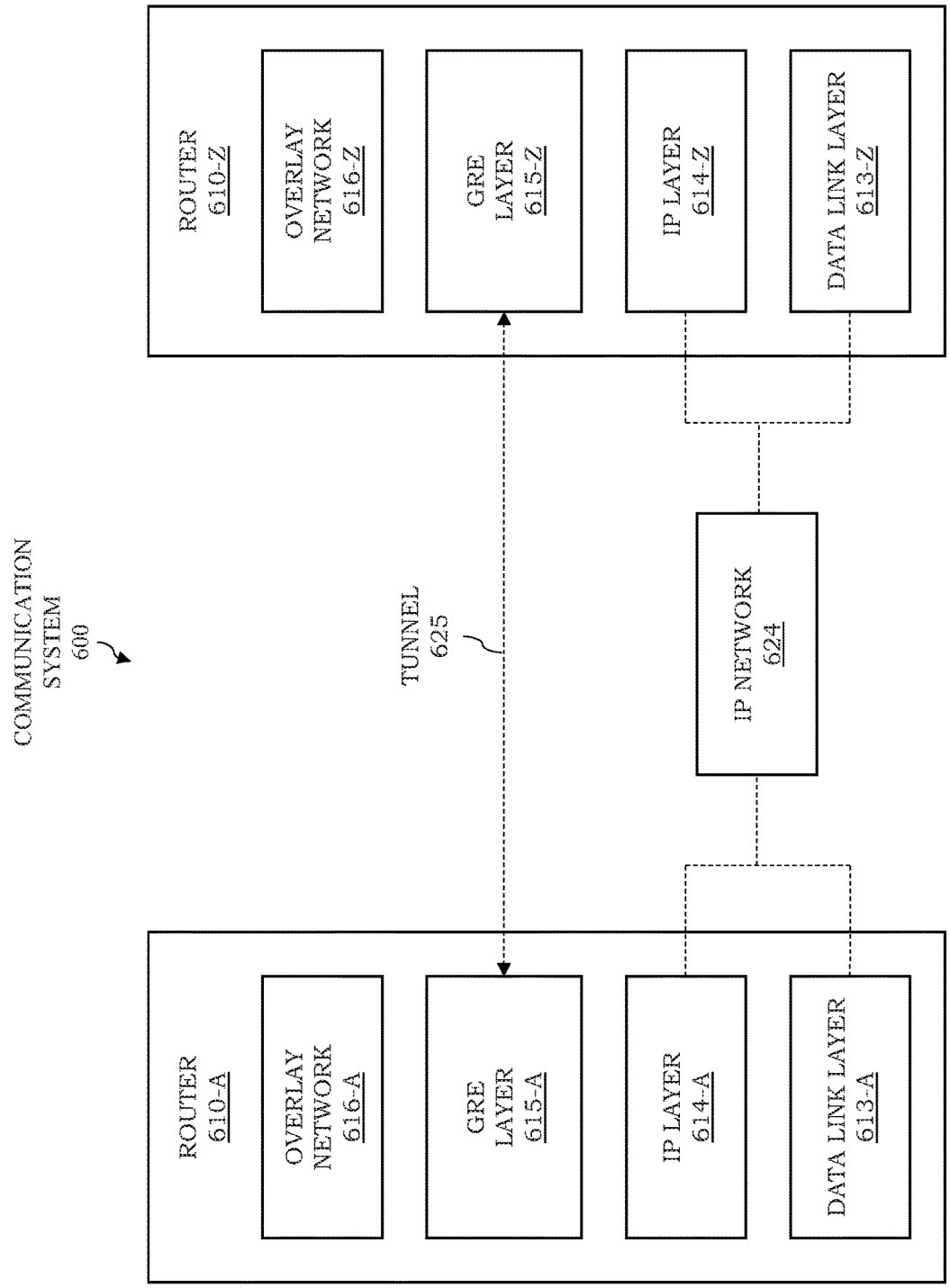
FIG. 6 depicts an example embodiment of a communication system configured to support NVGRE-based tunneling.

FIG. 6 depicts an example embodiment of a communication system configured to support NVGRE-based tunneling. The communication system 600 includes a pair of routers 610, including a router 610-A and a router 610-Z (collectively, routers 610) and an IP network 624 configured to support communications between the routers 610. The routers 610 support a data link layer 613 (illustratively, based on a data link layer 613-A on router 610-A and a data link layer 613-Z on router 610-Z), an IP layer 614 above the data link layer 613 (illustratively, based on an IP layer 614-A on router 610-A and an IP layer 614-Z on router 610-Z), a GRE layer 615 above the IP layer 614 (illustratively, based on a GRE layer 615-A on router 610-A and a GRE layer 615-Z on router 610-Z), and an overlay network 616 above the GRE layer 615 (illustratively, overlay network 616-A supported on router 610-A and overlay network 616-Z supported on router 610-Z). The data link layer 613, IP layer 614, GRE layer 615, and overlay network 616 on the routers 610, respectively, may form all or part of the communication protocol stacks configured on the routers 610 (e.g., based on the OSI model or one or more other suitable protocol stack models), respectively. The routers 610 are configured to provide a tunnel 625 based on the GRE layer 615, where it will be appreciated that the tunnel 625 is a connectionless, unreliable tunnel. It is noted that the format of a GRE tunneled packet is presented in FIG. 7.

Figure 7:
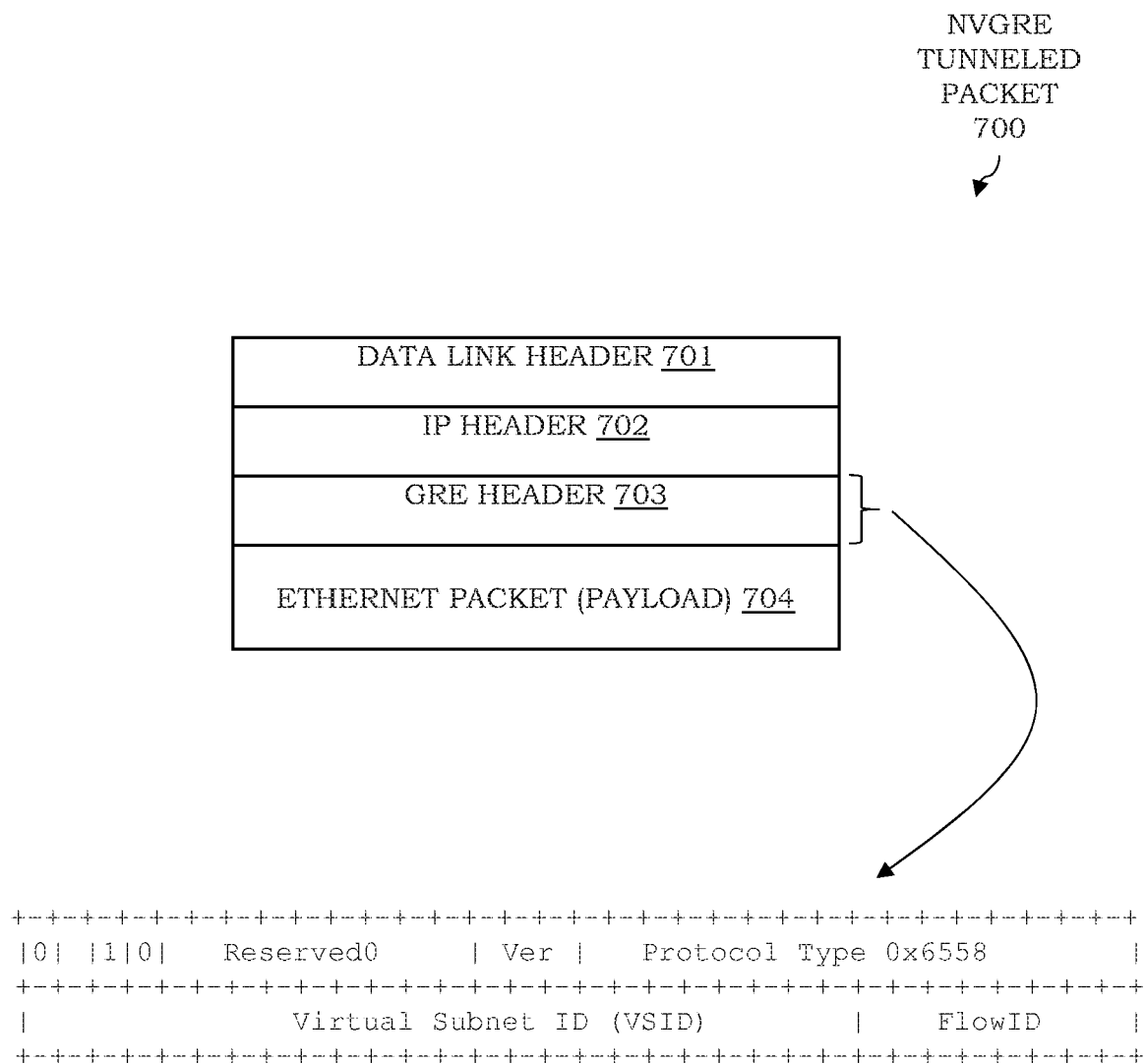
FIG. 7 depicts an example embodiment of a GRE tunneled packet which may be sent over a GRE tunnel.

FIG. 7 depicts an example embodiment of a GRE tunneled packet which may be sent over a GRE tunnel.

The GRE tunneled packet 700 includes a data link header 701, an IP header 702, a GRE header 703, and an Ethernet packet 704 of a virtual connection.

The data link header 701 is the link layer header to reach the immediate next-hop in the IP network. For example, for an Ethernet link from the router to the IP next-hop, this header will be the Ethernet Header.

The IP header 402 includes an IPv4 datagram header or an IPv6 datagram header. The source and destination addresses are set to addresses of the source and destination routers in the IP underlay, respectively. The IPv4 Protocol Number field or the IPv6 Next Header field in 402 is set to 47, indicating a GRE packet as the payload of IP.

The GRE header 703 includes the Protocol Type field that is set to the Ethertype value indicating the type of payload, i.e., the packet from the user of the GRE tunnel. The Protocol Type field in the GRE header 503 is set to the Ethertype value for 0x6558 that indicates "Transparent Ethernet Bridging". When the Ethertype value is 0x6558, the GRE header differs in the format and is called the NVGRE header. The NVGRE header includes the following fields after the Ethertype field: (1) a 3-octet Virtual Subnet ID (VSID) field which includes an identifier of the overlay multiplexed over the NVGRE-based tunnel and (2) a 1-octet FlowID field that indicates a per flow entropy within packets belonging to a VSID (e.g., which can be used for load balancing packets within the VSID). So, the key difference between the NVGRE header and the GRE header is the ability to multiplex multiple overlay networks using the VSID field.

The Ethernet Packet 704 is the payload of the NVGRE overlay, which is the packet on the overlaid Ethernet network. This encapsulation causes Ethernet packets on the NVGRE overlay to be tunneled across the IP network. When the receiving endpoint of the NVGRE overlay receives a packet, the receiving endpoint decapsulates the Ethernet packet by removing the IP and the GRE headers. Based on the Ethertype 0x6558 in GRE header, the receiving endpoint determines that the payload is an Ethernet packet on an overlay and the GRE header is of type NVGRE. Based on the VSID in the NVGRE header, the Ethernet network associated with the packet is identified and, accordingly, the packet is handled in the context of the Ethernet network.

It will be appreciated that NVGRE overlays may be used in various contexts, such as for network virtualization overlays (NVOs), virtual IP networks, chassis-based NFV routers, Fibre Channel virtualization, or the like.

NVGRE overlays, as indicated above, may be used to provide an NVO, which constructs the virtual Ethernet networks in a "multi-tenant" data center (DC) environment. A DC is a pool or collection of cloud infrastructure resources specifically designed for enterprise business needs. The basic resources are the servers (e.g., processor (e.g., central processing unit (CPU)), memory (e.g., random access memory (RAM), or the like), storage (e.g., disk space or the like), and networking (e.g., bandwidth) that interconnects servers and storages. A multi-tenant DC can host virtual DCs for multiple enterprise customers (called tenants) on a single physical infrastructure. A virtual DC is a virtual representation of a physical data center, complete with servers, storage clusters, and many networking components, all of which reside in the virtual space hosted by the multi-tenant DC. Servers for a virtual DC are virtualized with Virtual Machines (VMs). One or more VMs run atop a physical server, where each VM is assigned a share of processor cores and memory (e.g., RAM) of the physical server. VMs in a physical server can belong to the same tenant or may belong to different tenants. A thin layer of software called a "hypervisor" running in a physical server decouples the VMs from the physical server and dynamically allocates computing resources to each VM as needed. There are various solutions to virtualize storage, which are omitted at this point for simplicity. The VMs and virtualized storages for a tenant are interconnected by a virtual network specific to the tenant. The virtual network is implemented as an overlay network that sits atop the IP-based underlay which interconnects the physical resources in the DC. An NVO solution provides layer-2 virtual networks, enabling multi-tenancy and VM mobility across the virtual network of a tenant. Thus, each tenant is provided an independent island of virtualized servers, virtualized storages, and the virtual network interconnecting the virtualized servers and the virtualized storages. When an NVGRE overlay is deployed as NVO, the VSID in the NVGRE Header is the demultiplexer that identifies the virtual network. An example of an NVGRE overlay/NVO in a multi-tenant DC is depicted in FIGS. 8A-8B.

Figure 8A:
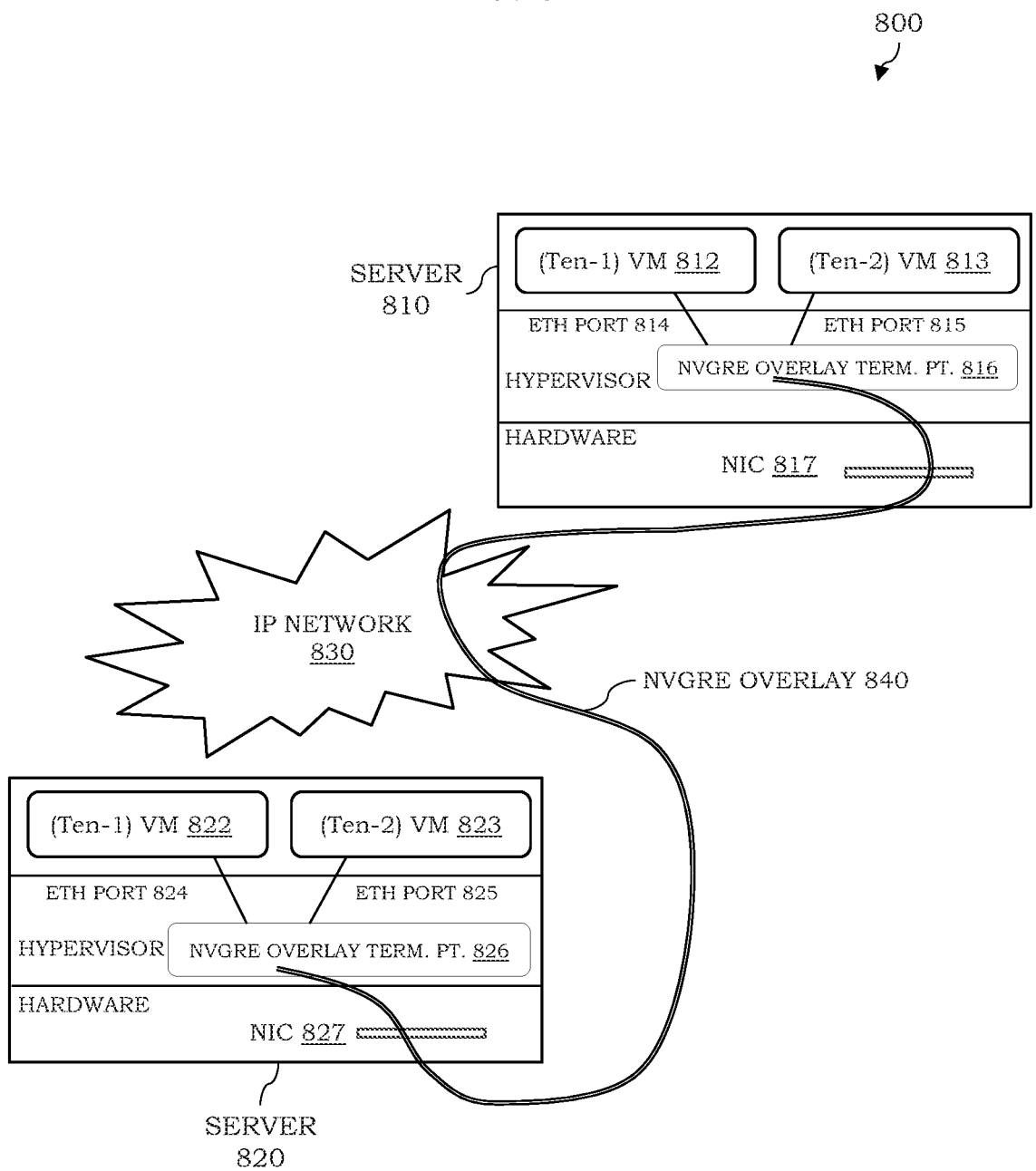
FIGS. 8A-8B depict example embodiments of NVGRE overlays/NVOs in a multi-tenant DC.
Figure 8B:
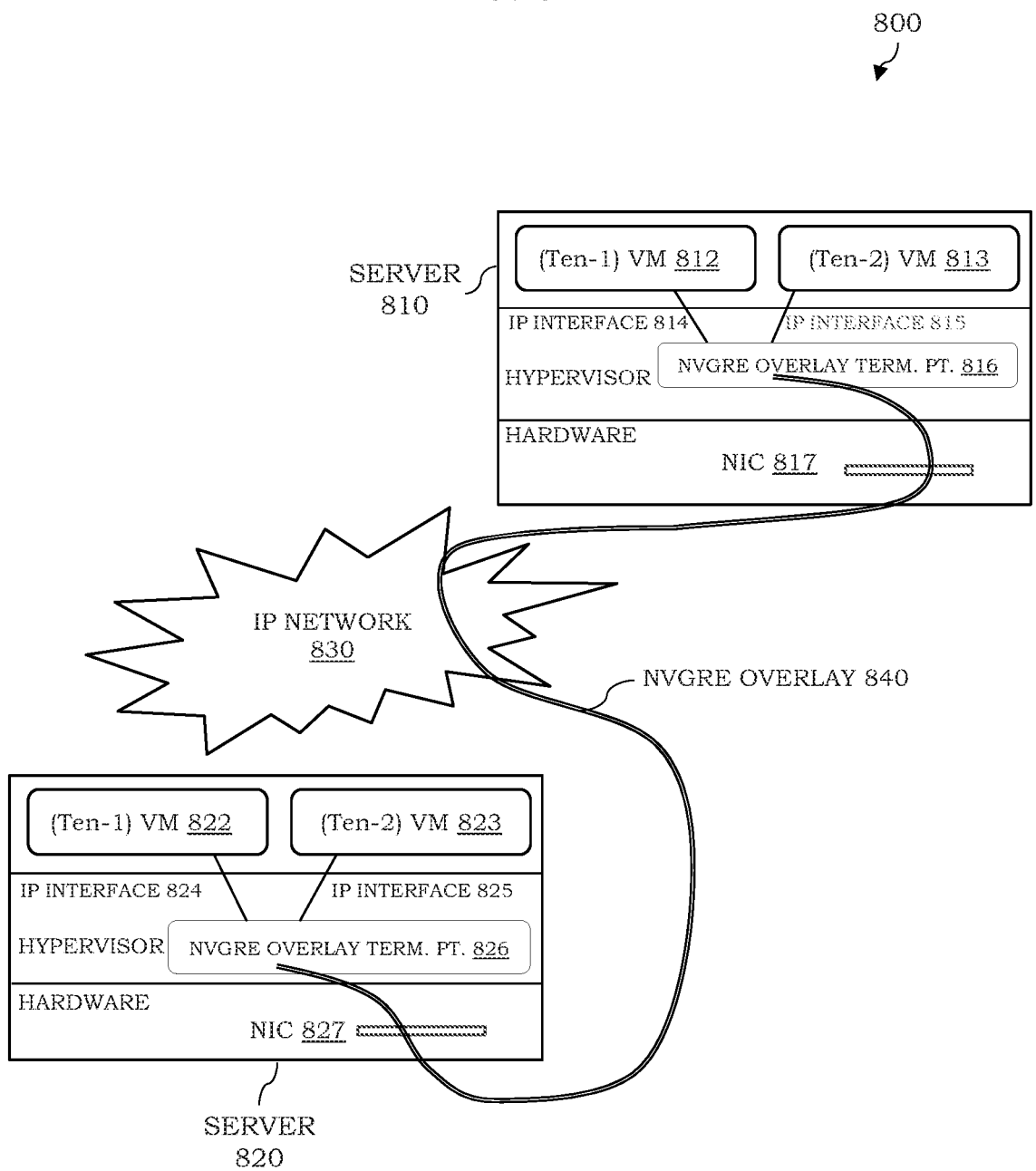

FIGS. 8A-8B depict example embodiments of NVGRE overlays/NVOs in a multi-tenant DC.

FIG. 8A depicts an example embodiment of an Ethernet NVGRE overlay/NVO in a multi-tenant DC.

In FIG. 8A, the communication system 800 includes a server 810 and a server 820. The server 810 and the server 820 are two physical servers connected by an IP network 830. In FIG. 8A, each physical server is shown to have been segregated into three strata: (1) a "hardware" layer including the processor, the memory (e.g., RAM), I/O ports, and so forth (e.g., such as in a network interface card (NIC), (2) a "hypervisor" layer that manages and allocates the hardware resources to VMs, and (3) VMs that run atop the hypervisor. The server 810 connects to the IP network via one or more ports in the NIC 817 (e.g., an Ethernet NIC). The server 820 connects to the IP network via one or more ports in the NIC 827 (e.g., an Ethernet NIC).

In FIG. 8A, there are two tenants hosted by each physical server, which are named as Ten-1 and Ten-2 respectively ("Ten" is used as short-hand notation of "Tenant"). VM 812 and VM 822 are the VMs (servers) for Ten-1 hosted in physical servers 810 and 820, respectively. VM 813 and VM 823 are the VMs (servers) for Ten-2 hosted in physical servers 810 and 820, respectively. FIG. 8A illustrates a virtual network among the VMs of each tenant using an NVGRE overlay/NVO. For simplicity, the virtual network here is a point-to-point Ethernet link since each tenant only has two VMs.

In FIG. 8A, an NVGRE overlay 840 is created between the hypervisors in each physical server 810 and 820. The NVGRE overlay termination point 816 in server 810 is located in the hypervisor in server 810. The NVGRE overlay termination point 816 is configured with an IP address to be used for the IP underlay, such that the address is reachable by the IP network 830. The NVGRE overlay termination point 826 in server 820 is located in the hypervisor in server 820. The NVGRE overlay termination point 826 is configured with an IP address to be used for the IP underlay, such that the address is reachable by the IP network 830. Each tenant is assigned a network wide unique NVGRE VSID to be used for its NVGRE overlay. In this example, assume that Ten-1 is assigned VSID 100 and Ten-2 is assigned VSID 200. It is noted that, herein, the NVGRE termination points 816 and 826 may be considered to be equivalent to the routers depicted in FIGS. 1, 2, and 5.

In FIG. 8A, VM 812 is connected to NVGRE overlay termination point 816 via a virtual Ethernet port 814 and, similarly, VM 822 is connected to NVGRE overlay termination point 826 via a virtual Ethernet port 824. In the NVGRE overlay termination point 816, the virtual Ethernet port 814 is mapped to the VSID 100. In the NVGRE overlay termination point 826, the virtual Ethernet port 824 is mapped to the VSID 100. This completes the set-up of the point-to-point virtual network between the VMs of Ten-1.

In FIG. 8A, VM 813 is connected to NVGRE overlay termination point 816 via a virtual Ethernet port 815 and, similarly, VM 823 is connected to NVGRE overlay termination point 826 via a virtual Ethernet port 825. In the NVGRE overlay termination point 816, the virtual Ethernet port 815 is mapped to the VSID 200. In the overlay termination point 826, the virtual Ethernet port 825 is mapped to the VSID 200. This completes the set-up of the point-to-point virtual network between the VMs of Ten-2.

In FIG. 8A, the payload of NVGRE overlay is a layer-2/Ethernet packet as each VM generates Ethernet packets.

In FIG. 8A, in Ten-1, assume that VM 812 sends a packet to VM 822. First, VM 812 sends an Ethernet packet via virtual Ethernet port 814. When the packet is received by the NVGRE overlay termination point 816, the NVGRE overlay termination point 816 pushes the NVGRE header with VSID 100 onto the packet and then pushes the tunneling encapsulation, i.e., the IP header. The source address in the IP header of the tunnel is set to the IP address of NVGRE overlay termination point 816 and destination address in the IP header of the tunnel is set to the IP address of the NVGRE overlay termination point 826. The resultant packet is sent by the NVGRE overlay termination 816 to the IP network 830. The packet, after being routed by the IP network 830, eventually reaches the NVGRE overlay termination point 826. The NVGRE overlay termination point 826 decapsulates the tunneling encapsulation and finds the NVGRE header with VSID 100 beneath the tunneling encapsulation. Since the VSID 100 is mapped in the NVGRE overlay termination point 826 to the virtual Ethernet port 824, the NVGRE header is removed and the resultant Ethernet packet is forwarded on virtual Ethernet port 824. The packet is then received by VM 822. In the same way, the VMs in Ten-2 exchange packets among each other over its virtual network. In this manner, multiple Ethernet networks are multiplexed between two tunneling endpoints using their respective NVGRE VSIDs.

Various example embodiments for supporting transport of multiple protocols over network virtualization technology may be configured to support use of NVGRE to support virtualization of various types of non-Ethernet networks. This may provide various advantages or potential advantages by overcoming various potential limitations of NVGRE that may enable NVGRE to only virtualize Ethernet networks and, thus, to only carry Ethernet packets as the payload.

Various example embodiments for supporting transport of multiple protocols over network virtualization technology may be configured to support use of NVGRE to support virtual IP networks. In this case, an overlay network between the VMs (rather than NVO) is a layer-3 network (e.g., an IP network) instead of an Ethernet network. For each tenant, a pair of its VMs are interconnected by a virtual IP interface. Assuming that NVGRE configured with a capability to transport IP packets, then an NVGRE overlay is deployed where the VSID in the NVGRE Header is the demultiplexer that identifies the virtual IP network. An example embodiment of an IP NVGRE overlay/NVO in a multi-tenant DC is presented with respect to FIG. 8B.

FIG. 8B depicts an example embodiment of an IP NVGRE overlay/NVO in a multi-tenant DC.

In FIG. 8B, the communication system 800 includes a server 810 and a server 820. The server 810 and the server 820 are two physical servers connected by an IP network 830. In FIG. 8B, each physical server is shown to have been segregated into three strata: (1) a "hardware" layer including the processor, the memory (e.g., RAM), I/O ports, and so forth (e.g., such as in a network interface card (NIC), (2) a "hypervisor" layer that manages and allocates the hardware resources to VMs, and (3) VMs that run atop the hypervisor. The server 810 connects to the IP network via one or more ports in the NIC 817 (e.g., an Ethernet NIC). The server 820 connects to the IP network via one or more ports in the NIC 827 (e.g., an Ethernet NIC).

In FIG. 8B, there are two tenants hosted by each physical server, which are named as Ten-1 and Ten-2 respectively ("Ten" is used as short-hand notation of "Tenant"). VM 812 and VM 822 are the VMs (servers) for Ten-1 hosted in physical servers 810 and 820, respectively. VM 813 and VM 823 are the VMs (servers) for Ten-2 hosted in physical servers 810 and 820, respectively. FIG. 8B illustrates a virtual IP network among the VMs of each tenant using an NVGRE overlay/NVO. For simplicity, the virtual network here is a point-to-point IP interface since each tenant only has two VMs.

In FIG. 8B, an NVGRE overlay 840 is created between the hypervisors in each physical server 810 and 820. The NVGRE overlay termination point 816 in server 810 is located in the hypervisor in server 810. The NVGRE overlay termination point 816 is configured with an IP address to be used for the IP underlay, such that the address is reachable by the IP network 830. The NVGRE overlay termination point 826 in server 820 is located in the hypervisor in server 820. The NVGRE overlay termination point 826 is configured with an IP address to be used for the IP underlay, such that the address is reachable by the IP network 830. Each tenant is assigned a network wide unique NVGRE VSID to be used for its NVGRE overlay. In this example, assume that Ten-1 is assigned VSID 100 and Ten-2 is assigned VSID 200. It is noted that, herein, the NVGRE termination points 816 and 826 may be considered to be equivalent to the routers depicted in FIGS. 1, 2, and 5.

In FIG. 8B, VM 812 is connected to NVGRE overlay termination point 816 via a virtual IP interface 814 and, similarly, VM 822 is connected to NVGRE overlay termination point 826 via a virtual IP interface 824. In the NVGRE overlay termination point 816, the virtual IP interface 814 is mapped to the VSID 100. In the NVGRE overlay termination point 826, the virtual IP interface 824 is mapped to the VSID 100. This completes the set-up of the point-to-point virtual IP interface between the VMs of Ten-1.

In FIG. 8B, VM 813 is connected to NVGRE overlay termination point 816 via a virtual IP interface 815 and, similarly, VM 823 is connected to NVGRE overlay termination point 826 via a virtual IP interface 825. In the NVGRE overlay termination point 816, the virtual IP interface 815 is mapped to the VSID 200. In the overlay termination point 826, the virtual IP interface 825 is mapped to the VSID 200. This completes the set-up of the point-to-point virtual IP interface between the VMs of Ten-2.

In FIG. 8B, the payload of NVGRE overlay is an IP packet as each VM generates IP packets on its respective virtual IP interface.

In FIG. 8B, in Ten-1, assume that VM 812 sends an IP packet to VM 822. First, VM 812 sends the IP packet via virtual IP interface 814. When the packet is received by the NVGRE overlay termination point 816, the NVGRE overlay termination point 816 pushes the NVGRE header with VSID 100 onto the packet and then pushes the tunneling encapsulation, i.e., the IP header. The source address in the IP header of the tunnel is set to the IP address of NVGRE overlay termination point 816 and destination address in the IP header of the tunnel is set to the IP address of the NVGRE overlay termination point 826. The resultant packet is sent by the NVGRE overlay termination 816 to the IP network 830. The packet, after being routed by the IP network 830, eventually reaches the NVGRE overlay termination point 826. The NVGRE overlay termination point 826 decapsulates the tunneling encapsulation and finds the NVGRE header with VSID 100 beneath the tunneling encapsulation. Since the VSID 100 is mapped in the NVGRE overlay termination point 826 to the virtual IP interface 824, the NVGRE header is removed and the resultant IP packet is forwarded on virtual IP interface 824. The packet is then received by VM 822. In the same way, the VMs in Ten-2 exchange packets among each other over its virtual network. In this manner, multiple virtual IP interfaces are multiplexed between two tunneling endpoints using their respective NVGRE VSIDs.

Various example embodiments for supporting transport of multiple protocols over network virtualization technology may be configured to support use of NVGRE to support a chassis-based NFV router.

NVGRE overlays, as indicated above, may be used to provide a chassis-based NFV router. An NFV-based router implements the router platform with one or more VMs on commodity, off-the-shelf physical servers, such as x86 based server platforms. There can be two approaches of implementing an NFV router: (1) non-chassis based, wherein the entire router is hosted on a single VM or (2) chassis based, wherein each component of a chassis-based router is implemented by a separate VM. It is noted that non-chassis-based NFV routers may be further understood with respect to FIG. 9 and chassis-based NFV routers may be further understood with respect to FIGS. 10 and 11.

Figure 9:
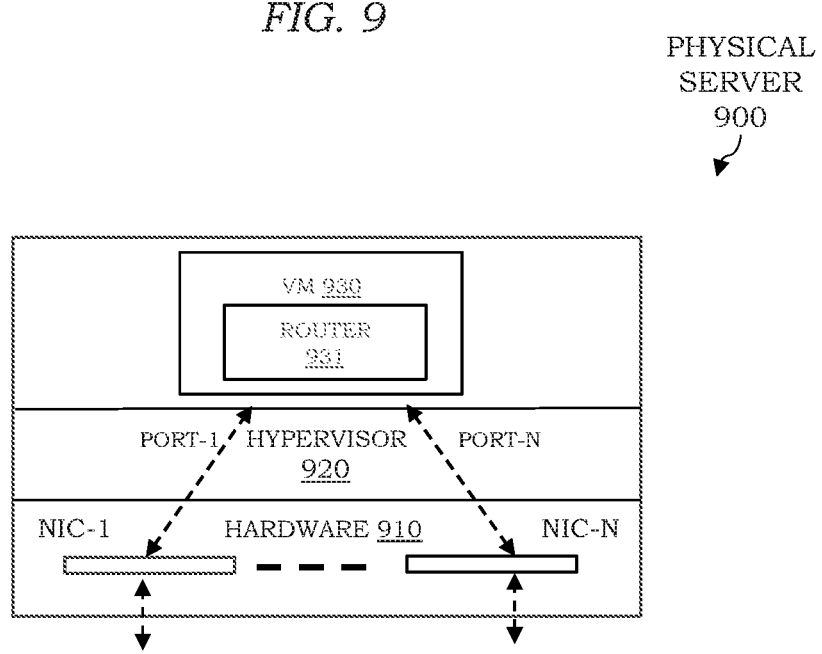
FIG. 9 depicts an example embodiment of a non-chassis based NFV router that runs as a VM on the hypervisor on a physical server

FIG. 9 depicts an example embodiment of a non-chassis based NFV router that runs as a VM on the hypervisor on a physical server. The physical server 900 receives the packets from ports on the NICs, processes the packets, and forwards the packets to the relevant destinations via ports on the NICs. For optimal performance, the NICs assigned to the router are directly controlled by the router (e.g., Single Root Input/Output Virtualization (SR-IOV), Peripheral Component Interconnect (PCI)-Passthrough, or the like) without requiring any mediation by the hypervisor. The control plane and the forwarding plane of the router reside within the single VM. It is noted that, as the NICs are Ethernet based, NFV routers support only Ethernet as the data link layer.

Figure 10:
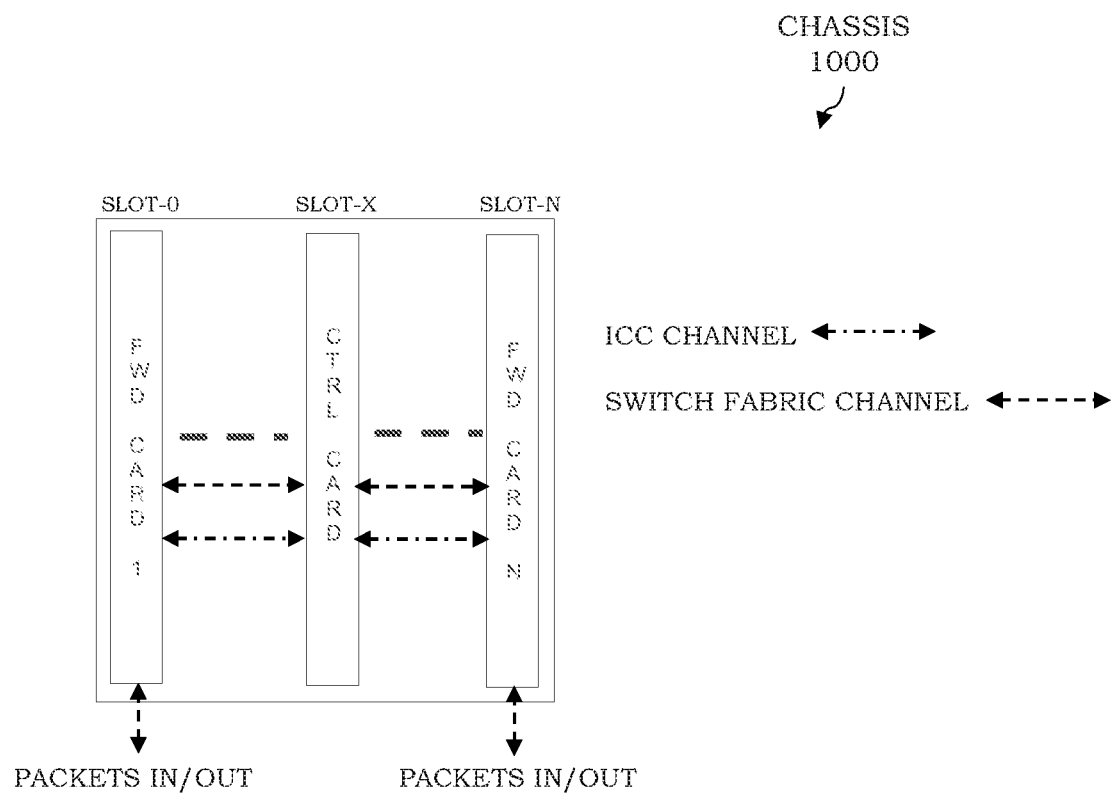
FIG. 10 depicts an example embodiment of a chassis-based router platform having cards connected by internal network.

FIG. 10 depicts an example embodiment of a chassis-based router platform having cards connected by internal networks. The chassis 1000 includes a fixed number of slots, where each slot hosts a card. The chassis 1000 includes at least one control plane card (shown as CTRL CARD) that operates the control plane of the router. There could be more than one control plane card for redundancy purposes, but for simplicity only one control plane card is depicted. The remaining slots of the chassis host the forwarding plane cards, where each forwarding plane card includes the ports for packets transmit and receive. In FIG. 10, the chassis is shown to have (N+1) slots wherein, there are N forwarding plane cards (in slots 0-N, with the exception of slot x) and one control plane card (in slot x). The set of N forwarding plane cards implements the forwarding plane of the router that receives, processes, and sends out packets to designated destinations. Typically, there are at least two internal networks that connect all of the cards, where a root node (centralized entity) of each network is located in the control plane card. An expanded view of FIG. 10 that shows the interconnections of the two internal networks is depicted in FIG. 11.

Figure 11:
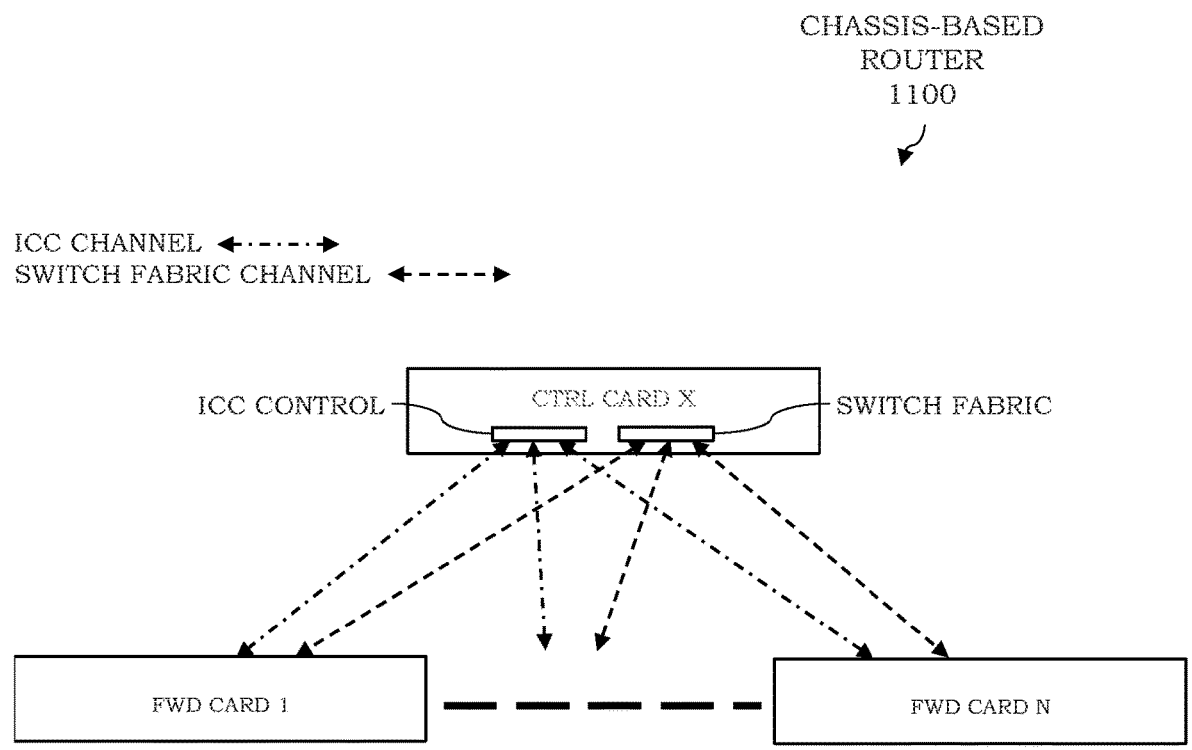
FIG. 11 depicts an example embodiment of internal networks of a chassis-based router platform.

FIG. 11 depicts an example embodiment of internal networks of a chassis-based router platform.

The chassis-based router 1100 includes a first network for supporting communication of data packets (e.g., a data packet arriving on a port in card 1 is forwarded via a port in card 4) and a second network for supporting communication of control and management messages (e.g., between the control plane card and the forwarding plane cards).

The first network is for the switch fabric through which data packets are switched across the cards. In FIG. 11, the switch fabric is hosted inside the control plane card, but it is also possible to have a separate switch fabric card. If a packet arriving on a port in card 1 needs to be sent out by a port in card 4 then, after performing ingress processing, card 1 sends the packet on the channel to the switch fabric, and the switch fabric then relays the packet to card 4 for egress processing and final transmission. Every card is connected to the switch fabric through a switch fabric channel (a link in the switch fabric network).

The second network is for the inter-card communication (ICC). The ICC control is in the control plane, which is connected to every forwarding plane card by an ICC channel (a link in the ICC network). The ICC network is used for all control and management messaging between the control plane and the forwarding planes. For example, configuration of the forwarding plane by the control plane is performed using the ICC network. Any alarms or alerts generated by a forwarding plane are notified to the control plane through ICC network. The heartbeats to check the connectivity between the cards are exchanged as ICC messages.

It is noted that both the ICC and switch fabric networks are lossless, which means that packets/messages are reliably transported without any drop.

It will be appreciated that, although primarily presented with respect to use of two interconnect networks, there could be more than two interconnect networks.

Figure 12:
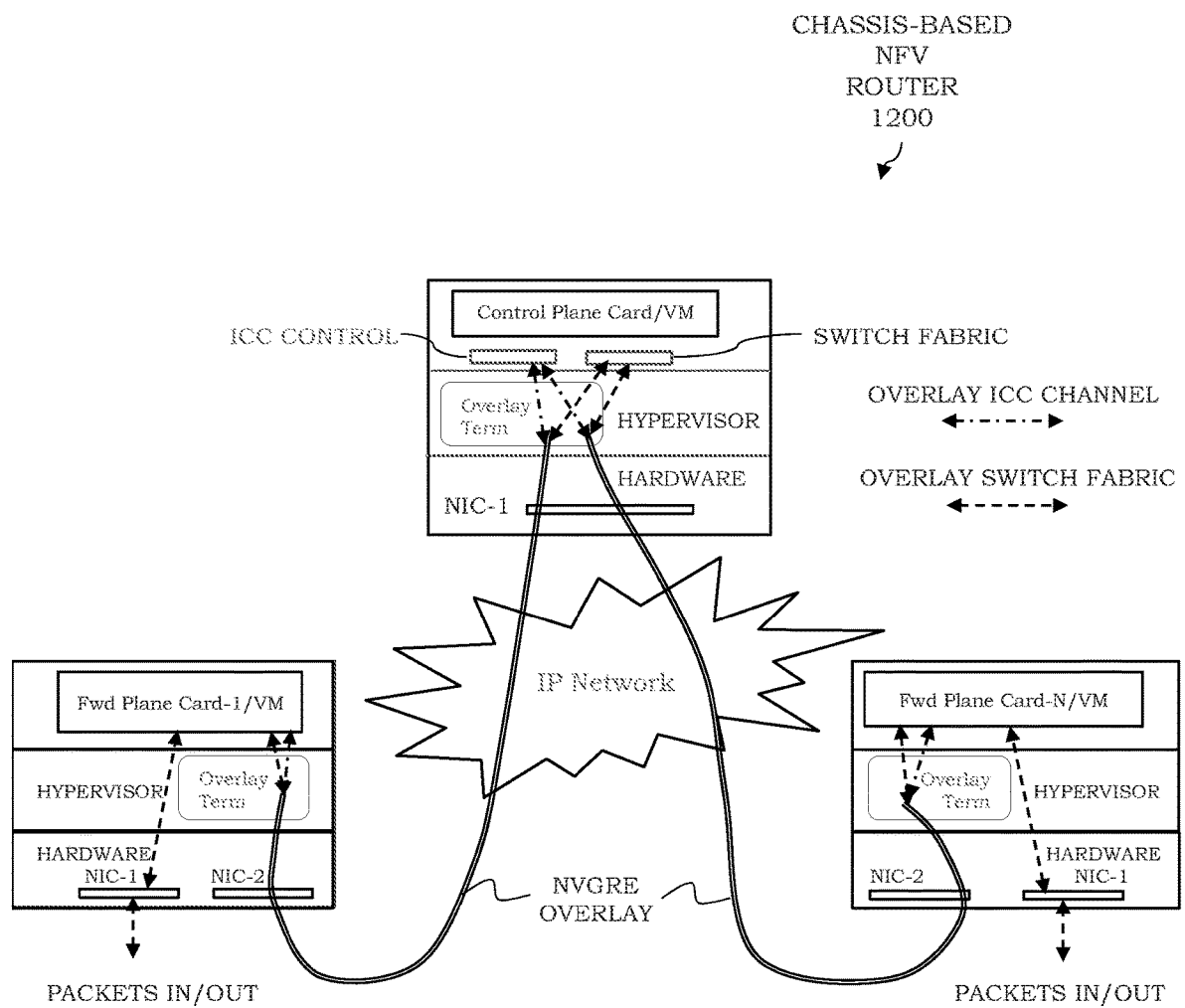
FIG. 12 depicts an example embodiment of a chassis-based network function virtualization (NFV) router.

It will be appreciated that a chassis-based router may be virtualized as a chassis-based NFV router, as example of which is presented with respect to FIG. 12.

FIG. 12 depicts an example embodiment of a chassis-based NFV router. The chassis-based NFV router 1200 provides a virtualized version of the chassis-based router presented with respect to FIG. 10 using commodity off-the-shelf server hardware (e.g., in the chassis-based NFV router 1200, each card of the chassis-based router 1000 of FIG. 10 is emulated by a VM and each VM resides in a separate physical server to minimize the single point of failure. Here, the term "control plane server" is used to denote the physical server that hosts the VM for the control plane card and the term "forwarding plane server-x" is used to denote the physical server that hosts the VM for the forwarding plane card-x.

In FIG. 12, the control plane and the forwarding plane VMs are separated by an IP network. It is possible that the VMs are located within a local area network (LAN), i.e., within the same IP subnet. However, herein we consider the separation by an IP network as it is the superset case that can also satisfy the requirements, if the VMs are connected within a LAN. In FIG. 12, each forwarding plane VM uses its NIC-1 to emulate the ports for packet receive and transmit. For optimal performance, the NIC-1 is directly controlled by the forwarding plane VM (e.g., using SR-IOV, PCI-Passthrough, or the like) without requiring any mediation by the hypervisor. Each forwarding plane server uses a port on NIC-2 to connect to the IP network. The control plane server uses a port on NIC-1 to connect to the IP network.

In FIG. 12, for example, various example embodiments may be configured to support use of NVGRE to transport any type of packets. In at least some such embodiments, the ICC and switch fabric channels between the VMs can be setup as NVGRE overlays across the IP network. The NVGRE overlay termination points are located in the hypervisors. There are two NVGRE overlays between each forwarding plane server and the control plane server—one for the ICC channel and another for the switch fabric channel. The use of NVGRE in this manner may be further understood with respect to the following example. In this example, assume that the VSID used by the overlay for the ICC channel is 100 and that the VSID used by the overlay for the switch fabric channel is 200.

In this example of FIG. 12, in order to create an IP underlay for the overlay, each overlay termination point creates an IP address on its respective port on the NIC connected to the IP network, such that the IP address is routable by the IP network. The IP address on the overlay termination point at forwarding plane server-x is denoted as "F-IPx" and the IP address on the overlay termination at the control plane server is denoted as "C-IP". The overlay termination point at each forwarding plane server is configured with one underlay tunnel with its destination IP address as C-IP. The overlay termination point at the control plane server is configured with N underlay tunnels, one to each forwarding plane server. For example, the destination IP addresses of the underlay tunnels to forwarding plane server-1 through forwarding plane server-N are F-IP1 through F-IPN, respectively.

In this example of FIG. 12, a forwarding plane VM connects to its local overlay termination point with two virtual ports—one for the ICC channel and another for the switch fabric channel. Within the overlay termination point, the port for the ICC channel is mapped to VSID 100 and the port for the switch fabric channel is mapped to VSID 200. Both of the VSIDs are multiplexed on the NVGRE over the IP underlay tunnel to the control plane server.

In this example of FIG. 12, the control plane VM connects to its local overlay termination point with two virtual ports for each forwarding plane VM—one for the ICC channel and another for the switch fabric channel. So, there are a total of 2N virtual ports between the control plane VM and its local overlay termination point. Within the local overlay termination point: (1) the port for the ICC channel to a forwarding plane VM is mapped to VSID 100 and the IP underlay tunnel to the forwarding plane server and (2) the port for the switch fabric channel to a forwarding plane VM is mapped to VSID 200 and the IP underlay tunnel to the forwarding plane server. It will be appreciated that the NVGRE overlays for the ICC and the switch fabric form two virtual networks, which is a case of NVO as described hereinabove.

In the example of FIG. 12, any ICC message from the forwarding plane VM emulating card-1 to the control plane VM would be first sent on its virtual port for the ICC channel. When the local overlay termination point receives the message, it pushes an NVGRE header with VSID 100 and then the tunnel encapsulation with source IP address F-IP1 in the IP header and destination IP address C-IP in the IP header. Then the packet is sent to the IP network via the port in NIC-2. When the overlay termination point in the control plane server receives the packet, it performs the following actions: (1) identifies the source forwarding plane server based on the source IP address in the tunnel encapsulation, (2) removes the tunnel encapsulation, (3) finds the NVGRE header with VSID 100 and, based on VSID 100, demultiplexes the packet as including an ICC message and removes the NVGRE header, (4) finds, based on the identified source forwarding plane server, the virtual port to the control plane VM which is mapped for the ICC channel with the forwarding plane VM, and (5) forwards the ICC message on the virtual port. The ICC message is received by the ICC control module in the control plane VM.

In the example of FIG. 12, any packet to be sent on the switch fabric channel from the forwarding plane VM emulating card-1 to control plane VM would be first sent on its virtual port for the channel. When the local overlay termination point receives the message, it pushes the NVGRE header with VSID 200 and then the tunnel encapsulation with source IP address F-IP1 in the IP header and destination IP address C-IP in the IP header. Then the packet is sent to the IP network via the port in NIC-2. When overlay termination point in the control plane server receives the packet, it performs the following actions: (1) identifies the source forwarding plane server based on the source IP address in the tunnel encapsulation, (2) removes the tunnel encapsulation, (3) finds the NVGRE header with VSID 200 and, based on the VSID 200, demultiplexes the packet as including a packet for the switch fabric and removes the NVGRE header, (4) finds, based on the identified source forwarding plane server, the virtual port to the control plane VM which is mapped for the switch fabric channel with the forwarding plane VM, and (5) forwards the packet on the virtual port. The packet is received by the switch fabric in the control plane VM.

It is noted that, if the physical servers in FIG. 12 only host a single forwarding plane or control plane VM then, for optimal performance, the overlay termination points may be also implemented within respective VMs to avoid context switching with the hypervisor while sending and receiving packets on the channels. In that case, NIC-2 in forwarding plane server would be directly controlled by the forwarding plane VM (e.g., using SR-IOV, PCI Passthrough, or the like) and, similarly, NIC-1 in the control plane server would be directly controlled by the control plane VM (e.g., using SR-IOV, PCI-Passthrough, or the like).

Various example embodiments for supporting transport of multiple protocols over network virtualization technology may be configured to support use of NVGRE to support FC virtualization.

NVGRE overlays, as indicated above, may be used to support FC virtualization. FC is a high-speed data transfer protocol providing in-order, lossless delivery of raw block of data, which is primarily used to connect computer data storage to servers in storage area networks (SAN) in DCs. A SAN is a network of a pool of block-based storage devices that can be accessed/shared by multiple servers connected to the SAN. The reliability in FC is provided by its data link layer which is termed as FC-1 (FC-0 is the physical layer which is typically high-speed optical fibre). An example of transporting FC traffic on an NVGRE overlay in a multi-tenant DC is presented with respect to FIG. 13.

Figure 13:
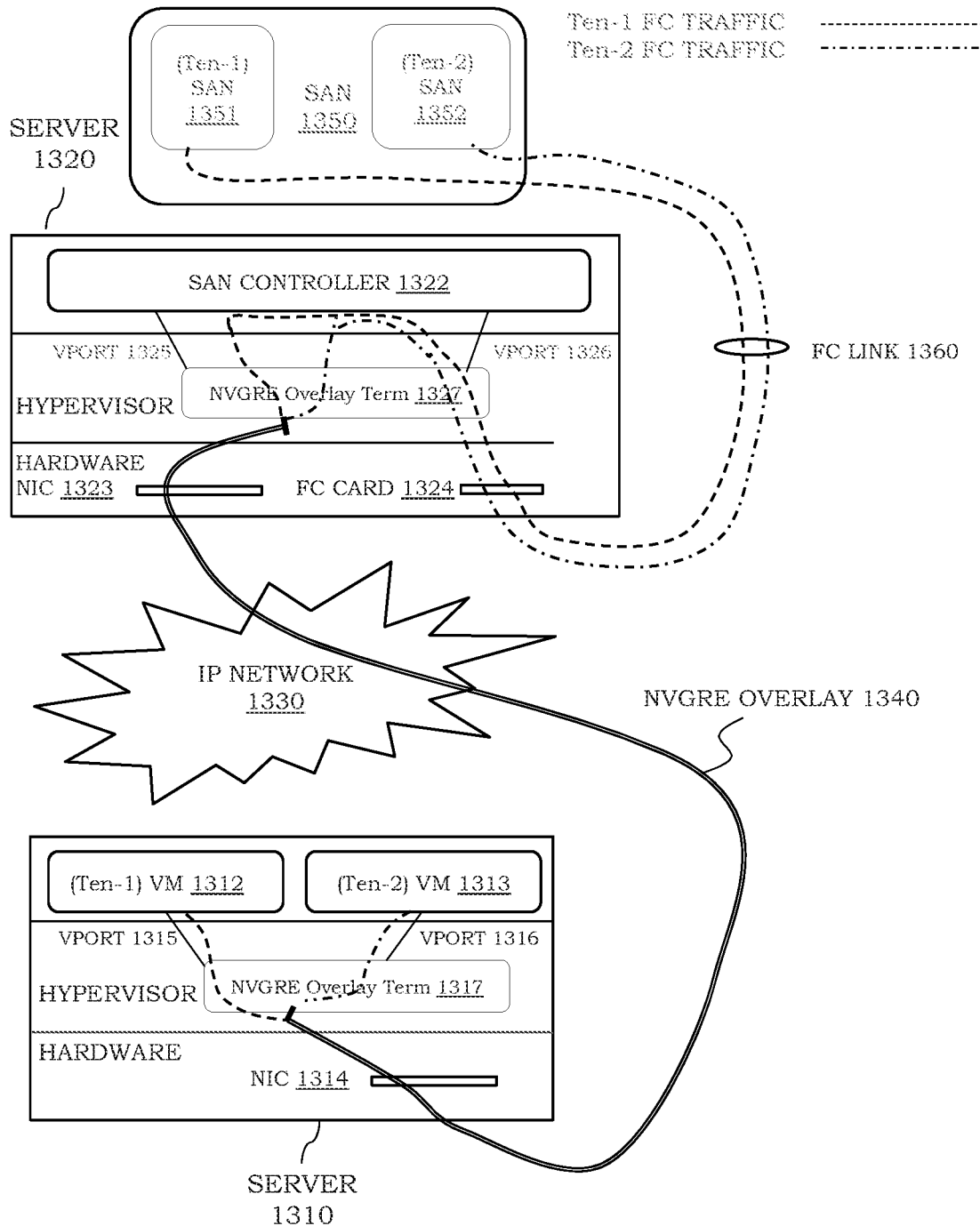
FIG. 13 depicts an example embodiment of a virtualized Fibre Channel (FC) using an NVGRE overlay.

FIG. 13 depicts an example embodiment of a virtualized Fibre Channel (FC) using an NVGRE overlay.

In FIG. 13, the communication system 1300 supports a virtualized FC, using an NVGRE overlay, for a pair of tenants referred to as Ten-1 and Ten-2. The communication system 1300 includes a server 1310, a server 1320, and a SAN 1350. The server 1310 hosts the VMs for Ten-1 and Ten-2, denoted as VM 1312 and VM 1313, respectively. The VMs run some tenant specific server applications. The server 1320 is a physical server which is directly attached to a SAN 1350 via an FC link 1360. The server 1320 interfaces with the FC link 1360 via a port on the FC Card 1324. The server 1320 hosts a VM that runs the function of the multi-tenant SAN controller 1322. Any access request to the SAN 1350 is made through the SAN controller 1322. To enable multi-tenancy, SAN 1350 is logically partitioned, so that it appears as multiple independent SANs. Logical SANs of Ten-1 and Ten-2 are mapped onto the SAN 1350 as SAN 1351 and SAN 1352, respectively. The SAN controller 1322 maintains the mappings of tenant-specific logical data blocks to the physical data blocks in the SAN 1350. This logical partitioning and mapping provide security, so that any bad access by a tenant does not corrupt data of another tenant. VM 1312 accesses the SAN 1351 and VM 1313 accesses the SAN 1352. The VMs 1312 and 1313 and their respective SANs 1351-1352 are located in remote sites physically separated by an IP network 1330. The physical separation is possible due to VM mobility (i.e., VMs can move across remote sites over the virtual network that connects the VMs), remote disk access, tape backup, and live mirroring. Similar to the model in FIG. 11, it is also possible to interconnect islands of multi-tenant FC SANs over IP networks to form a unified SAN in a single FC fabric. In FIG. 13, the idea is to interconnect the VMs 1312 and 1313 to their respective SANs 1351 and 1352 by carrying FC traffic in such a manner that the FC fabric on SAN 1360 and the FC devices are unaware of the presence of the IP network therebetween.

In FIG. 13, in order to emulate that VMs 1312-1313 are directly connected to their SANs 1351 and 1352, the segment of the FC link 1360 between VMs 1312-1313 and the SAN controller 1322 is virtualized. In at least some example embodiments, in which NVGRE is configured to support transport of packets of any protocol (and, thus, is configured to support transport of FC packets as in the example of FIG. 13), virtualization of the segment of the FC link 1360 between VMs 1312-1313 and the SAN controller 1322 may be achieved as follows. An NVGRE overlay is created between the hypervisors in server 1310 and server 1320, and the NVGRE overlay runs atop IP network 1330. The hypervisors host the NVGRE overlay termination points and each termination point is configured with a unique IP address which is routable from the IP network 1330. The hypervisor in server 1310 hosts the termination point 1317 and the hypervisor in server 1320 hosts the termination point 1327. The termination points 1317 and 1327 access the IP network via their respective local NIC cards 1313 and 1323, respectively. Each tenant is assigned a unique NVGRE VSID (e.g., assume that Ten-1 is assigned VSID 100 and Ten-2 is assigned VSID 200). The Ten-1 VM 1312 is connected to the NVGRE overlay termination 1317 via a virtual FC port 1315, which is mapped to VSID 100 in the NVGRE overlay termination 1317. The Ten-2 VM 1313 is connected to the NVGRE overlay termination 1317 via a virtual FC port 1316, which is mapped to VSID 200 in the 8NVGRE overlay termination 1317. The SAN controller 1322 is connected to the NVGRE overlay termination 1327 with two virtual FC ports—1325 and 1326 for Ten-1 and Ten-2, respectively. FC port 1325 is mapped to VSID 100 and FC port 1326 is mapped to VSID 200 in the NVGRE overlay termination 1327. VM 1312 sends a FC packet to SAN 1351 by virtual FC port 1315. When the FC packet is received by the NVGRE overlay termination 1317, it pushes the NVGRE header with VSID 100 as a demultiplexer for traffic belonging to Ten-1. Then, the NVGRE packet is sent to the remote NVGRE overlay termination 1327, by adding the IP underlay encapsulation. When the packet reaches NVGRE overlay termination 1327, It pops the IP underlay encapsulation as well as the NVGRE header with VSID 100 and forwards the resultant FC packet to the virtual FC port 1325 which is mapped to VSID 100. The SAN controller 1322 receives the FC packet on virtual FC port 1315 which is assigned to Ten-1, so the controller sends the required FC packet to SAN 1351 via FC link 1360. In the same way, VM 1313 accesses the SAN 1352.

It will be appreciated that, although primarily presented with respect to supporting transport of multiple protocols over NVGRE overlays in particular contexts (e.g., for virtual IP networks, chassis-based NFV routers, and FC virtualization), support for transport of multiple protocols over NVGRE overlays may be provided in various other contexts (e.g., Infiband, PCI Express (PCIe), Non-Volatile Memory Express (NVMe), grid computing, or the like, as well as various combinations there). For example, Infiband may be virtualized across storage systems over an NVGRE overlay. For example, a PCIe bus may be virtualized over an NVGRE overlay where PCIe traffic needs to be transported. For example, NVMe can be sent over an NVGRE overlay to access storage based on solid state drives. It will be appreciated that at least some such applications may be generalized as multi-tenant distributed I/O in DCs based on NVGRE overlays. For example, when a pool of VMs in a tenant forms a cluster of servers (e.g., in grid computing), where the VMs are physically separated by an IP network, then the interconnections in the cluster/grid can be implemented as NVGRE overlays. In general, there could be several types of distributed applications spanning across the VMs of a tenant, where the application traffic is transmitted between the VMs over the NVGRE overlay.

Various example embodiments for supporting transport of multiple protocols over NVGRE are configured to enable NVGRE to transport any kind of packets. The transport of packets of different protocols over NVGRE may be supported using two versions of a generic NVGRE (G-NVGRE) header referred to herein as "Generic NVGRE Type 1" (G-NVGRE-1) and "Generic NVGRE Type 2" (G-NVGRE-2). The G-NVGRE headers may be encoded in various ways as discussed further below.

Various example embodiments for supporting transport of multiple protocols over NVGRE are configured to enable NVGRE to transport any kind of packets based on use of a G-NVGRE-1 header type. The presence of G-NVGRE-1 may be indicated by encoding its Ethertype value in the "Protocol Type" field of the GRE header. A new Ethertype value (e.g., 0x6570 or any other suitable value) may be assigned for G-NVGRE-1. An example embodiment of the encoding of a G-NVGRE-1 header is depicted in FIG. 14. When the Ethertype value in the Protocol Type field is 0x6570, then the NVGRE header differs in format from the usual NVGRE header format (and is denoted as G-NVGRE-1) and includes the following fields after the Ethertype field: (1) a 3-octet Virtual Subnet ID (VSID) field which includes an identifier of the overlay multiplexed over the NVGRE-based tunnel and (2) a 1-octet FlowID field that indicates a per flow entropy within packets belonging to a VSID (e.g., which can be used for load balancing packets within VSID). It is noted that the format of the G-NVGRE-1 header is similar to the NVGRE header of FIG. 5, but the setting of the Protocol Type field enables configuration of the NVGRE header to form a G-NVGRE-1 header.

It is noted that the payload type carried by the G-NVGRE-1 header (i.e., the upper layer protocol) is not explicitly indicated in the G-NVGRE-1 header; rather the payload type expected on a VSID is determined in another way (e.g., by negotiation through an out-of-band mechanism between the NVGRE overlay termination points, by manual configurations at the NVGRE overlay termination points, or the like, as well as various combinations thereof).

It is noted that the G-NVGRE-1 header is particularly well-suited to payloads which are not standard protocols in networking stacks. For example, ICC messages may be multiplexed over an NVGRE overlay (e.g., the VSID assigned to the ICC channel is configured at each of the NVGRE overlay termination points for sending and receiving ICC packets only), switch fabric messages may be multiplexed over an NVGRE overlay (e.g., the VSID assigned to the switch fabric channel is configured at each of the NVGRE overlay termination points for sending and receiving switch fabric packets only), or the like, as well as various combinations thereof.

It is noted that the G-NVGRE-1 header also may be used to transport packets of standard protocols in networking stacks. For example, the G-NVGRE-1 header allows standard protocols as payloads (e.g., IP, FC, Infiband, PCIe, NVMe, or the like) as long as the NVGRE overlay termination points agree on the standard payload protocol type for an overlay (e.g., such as through out-of-band mechanisms, by manual configurations, or the like, as well as various combinations thereof).

It is noted that the G-NVGRE-1 header also may be used to transport packets of various other types of protocols.

Various example embodiments for supporting transport of multiple protocols over NVGRE are configured to enable NVGRE to transport any kind of packets based on use of a G-NVGRE-2 header type. The presence of G-NVGRE-2 may be indicated by encoding its Ethertype value in the "Protocol Type" field of the GRE header. A new Ethertype value (e.g., 0x6572 or any other suitable value) may be assigned for G-NVGRE-2. An example embodiment of the encoding of a G-NVGRE-2 header is depicted in FIG. 15. When the Ethertype value in the Protocol Type field is 0x6572, then the NVGRE header differs in format from the usual NVGRE header format (and is denoted as G-NVGRE-2) and includes the following fields after the Ethertype field: (1) a 3-octet Virtual Subnet ID (VSID) field which includes an identifier of the overlay multiplexed over the NVGRE-based tunnel, (2) a 1-octet FlowID field that indicates a per flow entropy within packets belonging to a VSID (e.g., which can be used for load balancing packets within VSID), and (3) an Upper Layer Protocol Type field that encodes the Ethertype value of the payload protocol type. It is noted that the payload type carried by this header (i.e., upper layer protocol) is explicitly indicated in the header.

It is noted that the G-NVGRE-2 header is particularly well-suited to payloads which are standard protocols in networking stacks. For example, in the use case of virtual IP networks, the payload of an NVGRE overlay is an IP packet and, in that case, the Upper Layer Protocol Type field encodes 0x800 for IPv4 packets and 0x86DD for IPv6 packets. For example, in the use case of fibre channel virtualization, the payload of the NVGRE overlay is an FC packet and, in that case, the Upper Layer Protocol Type field encodes the value 0x8906 which was originally standardized for FC in the FC over Ethernet (FCoE) specification. Similarly, for example, various other protocols types (e.g., Infiband, PCIe, NVMe, or the like) can be transported over NVGRE overlay using G-NVGRE-2 by encoding their respective standardized Ethertype values in Upper Layer Protocol Type field.

It is noted that the G-NVGRE-2 header also may be used to transport payloads which are not standard protocols in networking stacks.

It is noted that the G-NVGRE-2 header also may be used to transport packets of various other types of protocols.

Figure 16:
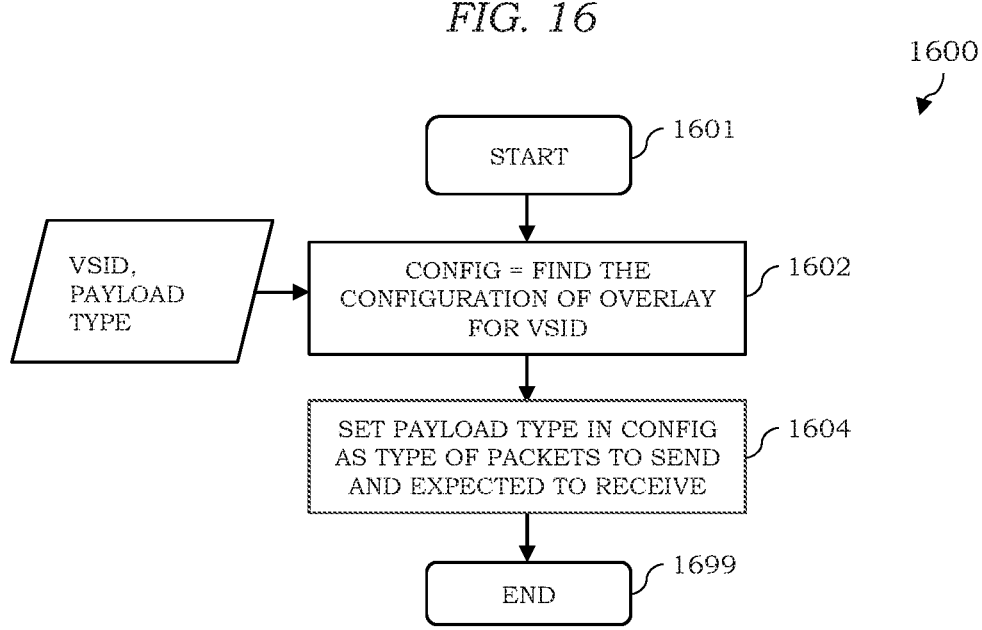
FIG. 16 depicts an example embodiment of a method for use by an NVGRE overlay termination point to configure a mapping of a payload type to a VSID at the NVGRE overlay termination point.
Figure 17:
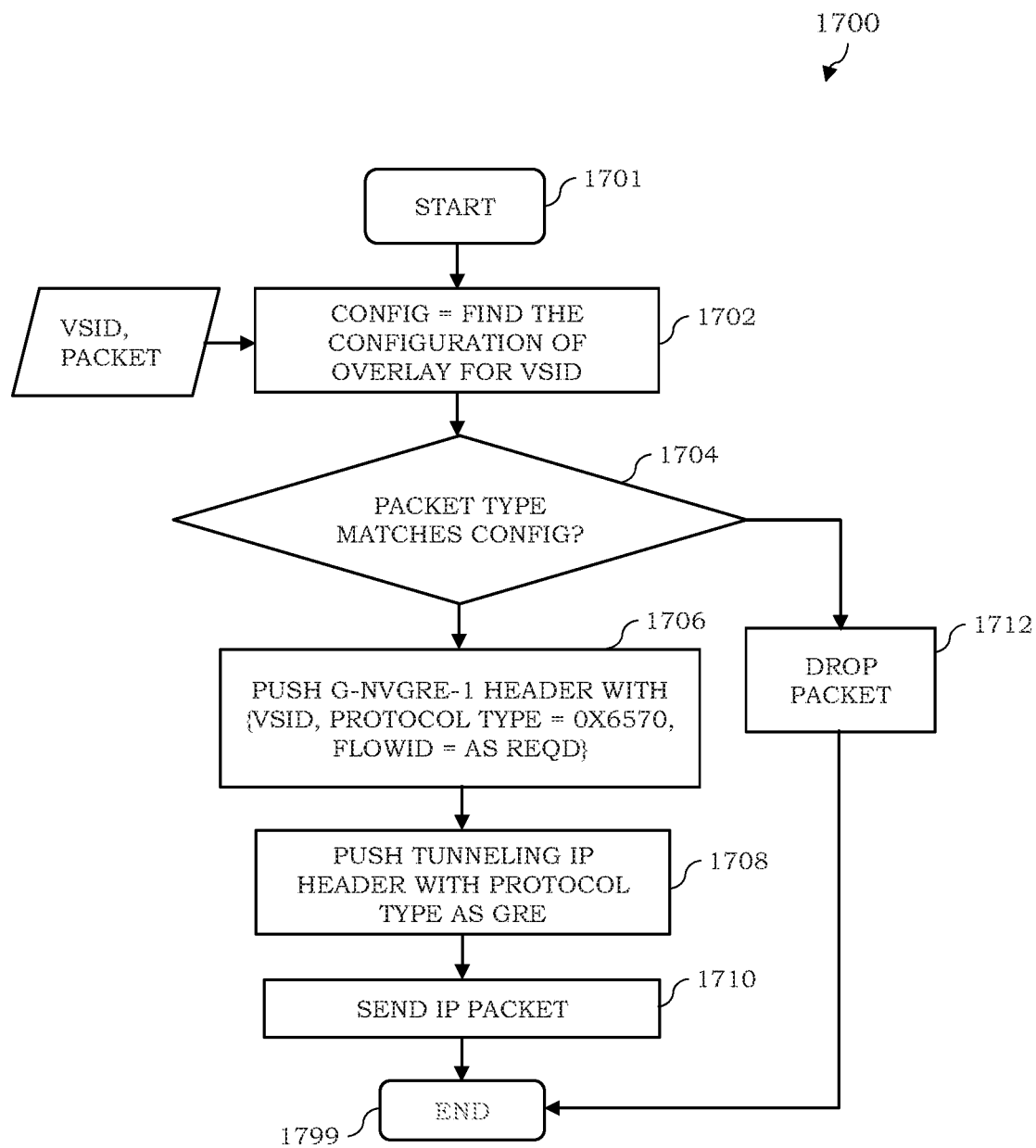
FIG. 17 depicts an example embodiment of a method for use by an NVGRE overlay termination point for sending an NVGRE overlay packet on an NVGRE overlay, wherein the packet is encoded with a G-NVGRE-1 header.
Figure 18:
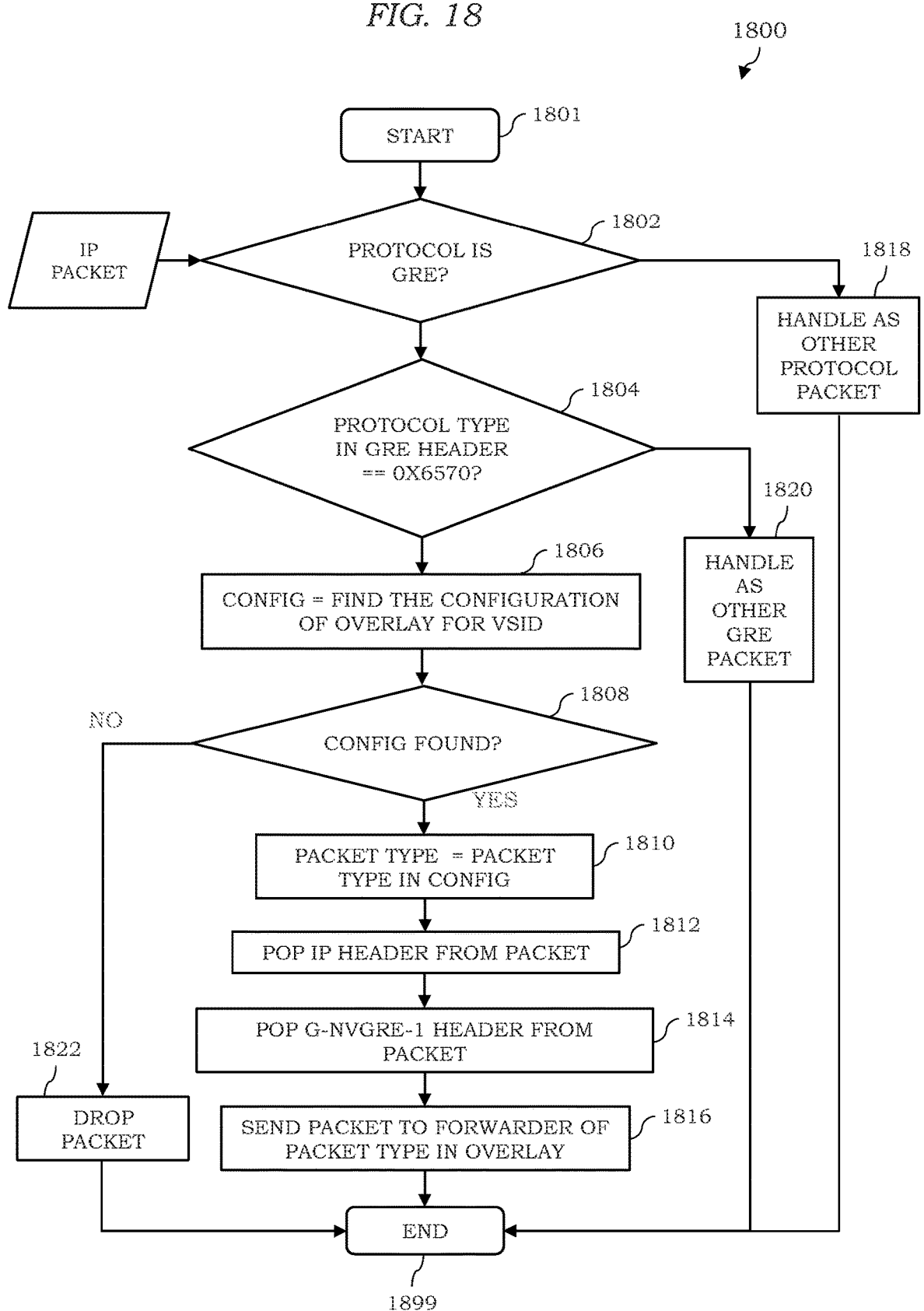
FIG. 18 depicts an example embodiment of a method for use by an NVGRE overlay termination point for receiving and processing an NVGRE overlay packet encoded with a G-NVGRE-1 header.

It will be appreciated that the operation of an NVGRE overlay with G-NVGRE-1 may be further understood by way of reference to FIGS. 16-18.

It is noted that, since the payload type is not indicated in the G-NVGRE-1 header, the NVGRE overlay termination points may be explicitly configured to send and receive a specific payload type (e.g., using an out-of-band negotiation mechanism between the NVGRE overlay termination points, using manual configuration at the NVGRE overlay termination points, or the like). It is noted that an example embodiment of a method for use by an NVGRE overlay termination point to configure a mapping of a payload type to a VSID at the NVGRE overlay termination point.

FIG. 16 depicts an example embodiment of a method for use by an NVGRE overlay termination point to configure a mapping of a payload type to a VSID at the NVGRE overlay termination point. It will be appreciated that, although primarily presented herein as being performed serially, at least a portion of the functions of method 1600 may be performed contemporaneously or in a different order than as presented in FIG. 16. The inputs to the method 1600 include the VSID of an NVGRE overlay and the Payload Type (an identifier of the payload type to be transported on the NVGRE overlay). At block 1601, the method 1600 begins. Block 1602 looks up the configuration of the NVGRE overlay corresponding to the VSID, and the method 1600 then proceeds to block 1604. Block 1604 sets the Payload Type in the configuration of the overlay that indicates the type of packets to be sent or expected to be received on the NVGRE overlay. From block 1604, the method 1600 proceeds to block 1699 where the method 1600 ends. At block 1699, the method 1600 ends.

FIG. 17 depicts an example embodiment of a method for use by an NVGRE overlay termination point for sending an NVGRE overlay packet on an NVGRE overlay, wherein the packet is encoded with a G-NVGRE-1 header. It will be appreciated that, although primarily presented herein as being performed serially, at least a portion of the functions of method 1700 may be performed contemporaneously or in a different order than as presented in FIG. 17. The inputs to the method 1700 include the VSID of an NVGRE overlay on which to send a packet and the packet to be sent on the NVGRE overlay. At block 1701, the method 1700 begins. Block 1702 looks up the configuration of the NVGRE overlay that matches the VSID, and then the method 1700 proceeds to block 1704. Block 1704 checks if the type of the packet matches the payload type configured in the configuration of the NVGRE overlay. If the type of packet matches the payload type configured in the configuration of the overlay then the method 1700 proceeds to block 1706, otherwise the method 1700 proceeds to block 1712. Block 1712 drops the packet and then the method proceeds to block 1799, where the method 1700 ends. Block 1706 pushes the G-NVGRE-1 header onto the packet with VSID. The Protocol Type is configured with value 0x6570 to indicate the GRE header of type G-NVGRE-1. The FlowID field is encoded as per the flow specific requirement of the packet. From block 1706 the method 1700 proceeds to block 1708. Block 1708 pushes the IP header of the tunnel. In the IP header, the source address is configured with an IP address of the local overlay termination point and the destination address is configured with an IP address of the remote overlay termination point. If the IP header is IPv4, then the Protocol ID field is encoded as 47 (=GRE). If the IP header is IPv6, then the Next Header field is encoded as 47 (=GRE). From block 1708, the method 1700 proceeds to block 1710. Block 1710 sends the IP packet on the underlay IP network. From block 1710, the method 1700 proceeds to block 1799 where the method 1700 ends. At block 1799, the method 1700 ends.

FIG. 18 depicts an example embodiment of a method for use by an NVGRE overlay termination point for receiving and processing an NVGRE overlay packet encoded with a G-NVGRE-1 header. It will be appreciated that, although primarily presented herein as being performed serially, at least a portion of the functions of method 1800 may be performed contemporaneously or in a different order than as presented in FIG. 18. The input to the method 1800 is an IP packet with a destination address as a local address of the IP underlay. At block 1801, the method 1800 begins. Block 1802 checks if the payload of the IP packet is GRE, which may be indicated by the Protocol ID field in the IPv4 Header as "47" or in the Next Header field in the IPv6 Header as "47" (although it will be appreciated that various other suitable values may be used to indicate the protocol type). If the payload of the IP packet is not GRE then the method 1800 proceeds to block 1818, otherwise the method 1800 proceeds to block 1804. Block 1818 handles the packet as per the non-GRE payload type, and then the method proceeds to block 1899 where the method 1800 ends. Block 1804 checks if the value in the Protocol Type field in the GRE header indicates that the header is G-NVGRE-1 (e.g., if the value is 0x6570). If the value in the Protocol Type field in the GRE header does not indicate that the header is G-NVGRE-1 then the method 1800 proceeds to block 1820, otherwise the method 1800 proceeds to block 1806. Block 1820 processes the packet as the other kind of GRE packet, and then the method 1800 proceeds to block 1899, where the method 1800 ends. Block 1806 looks up the NVGRE overlay configuration for the value in the VSID field of the G-NVGRE-1 header, and then the method 1800 proceeds to block 1808. Block 1808 checks if the NVGRE overlay configuration is found. If the NVGRE overlay configuration is not found then the method 1800 proceeds to block 1822, otherwise the method 1800 proceeds to block 1810. Block 1822 drops the packet, and then the method 1800 proceeds to block 1899 where the method 1800 ends. Block 1810 finds the expected payload type configured in the NVGRE overlay configuration, and then the method 1800 proceeds to block 1812. Block 1812 pops the IP header from the packet, and then the method 1800 proceeds to block 1814. Block 1814 pops the G-NVGRE-1 header from the packet, and then the method 1800 proceeds to block 1816. Block 1816 sends the packet (which is now the payload packet on the overlay) to the forwarder of the payload type in the context of the overlay, and then the method 1800 proceeds to block 1899 where the method 1800 ends. At block 1899, the method 1800 ends.

Figure 19:
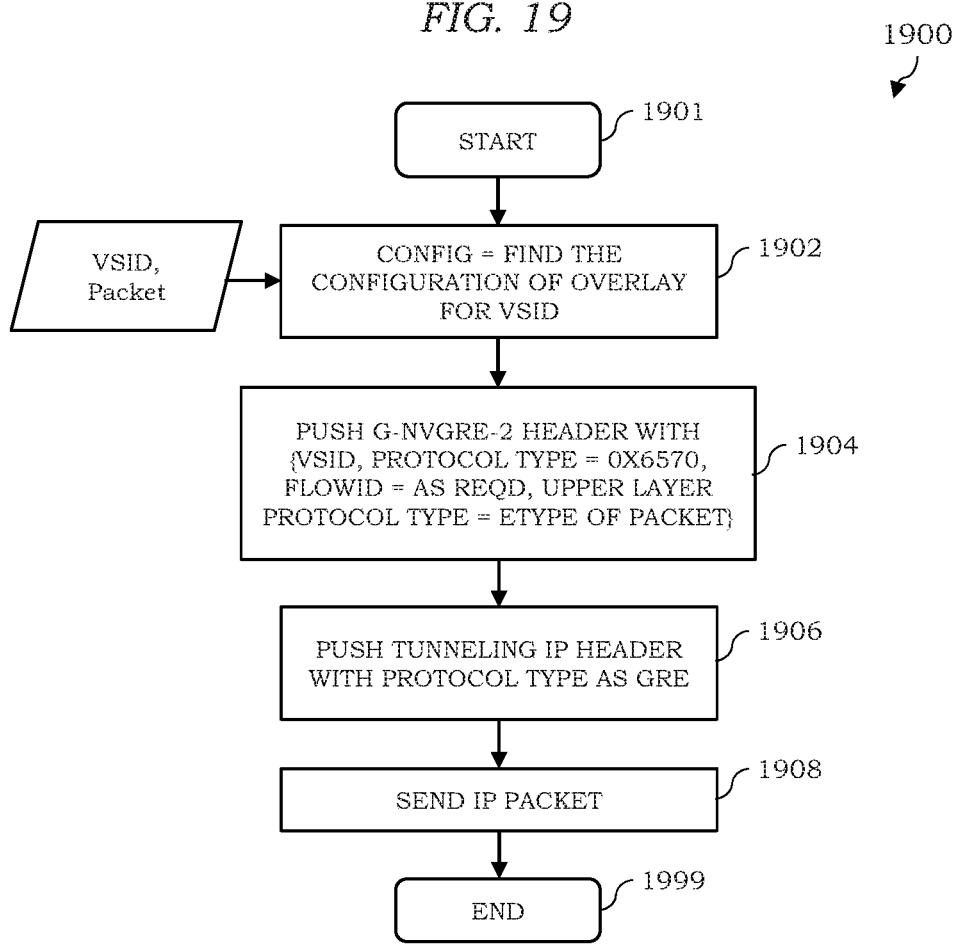
FIG. 19 depicts an example embodiment of a method for use by an NVGRE overlay termination point for sending an NVGRE overlay packet on an NVGRE overlay, wherein the packet is encoded with a G-NVGRE-2 header.
Figure 20:
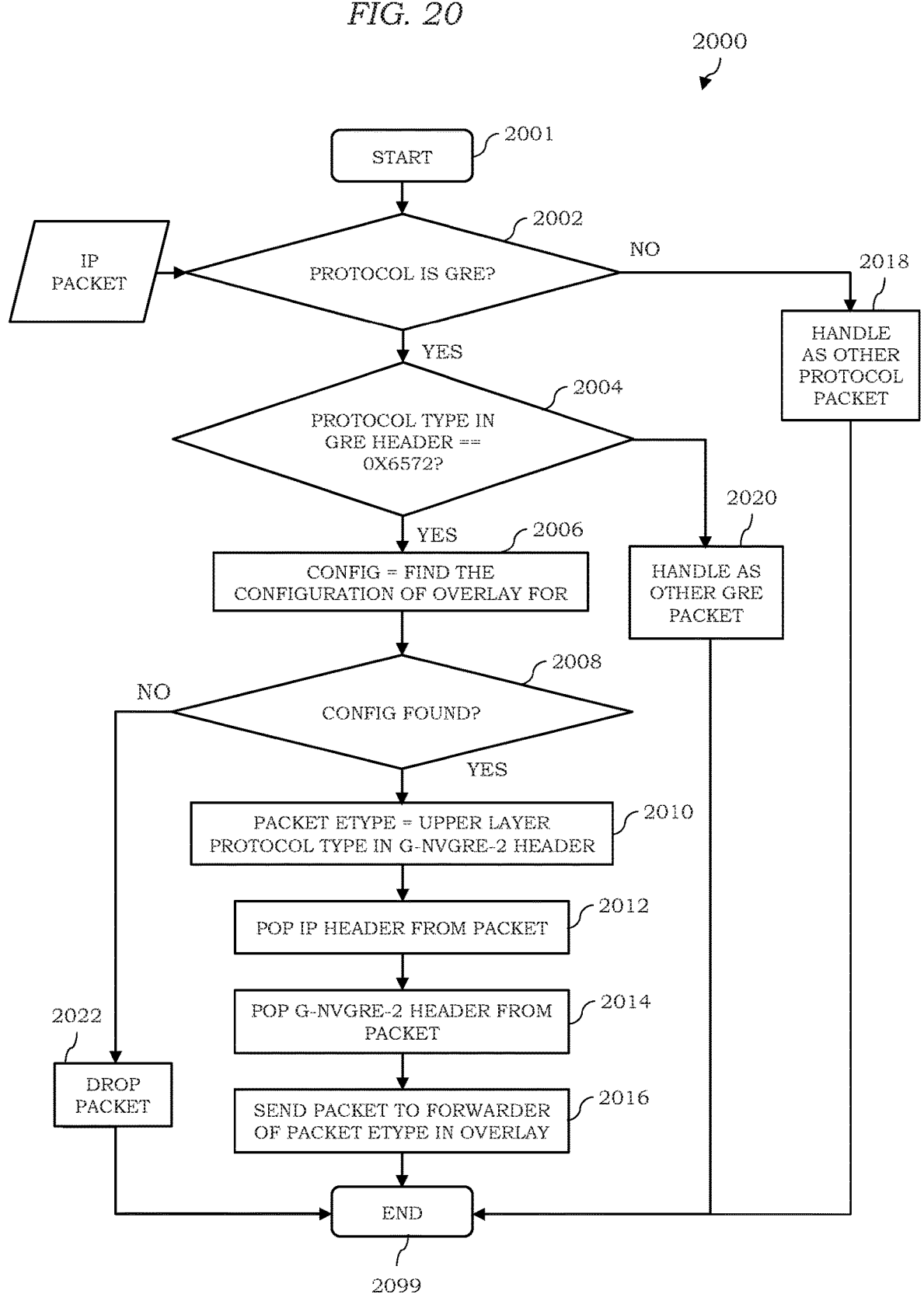
FIG. 20 depicts an example embodiment of a method for use by an NVGRE overlay termination point for receiving and processing an NVGRE overlay packet encoded with G-NVGRE-2 header.

It will be appreciated that the operation of an NVGRE overlay with G-NVGRE-2 may be further understood by way of reference to FIGS. 19-20.

FIG. 19 depicts an example embodiment of a method for use by an NVGRE overlay termination point for sending an NVGRE overlay packet on an NVGRE overlay, wherein the packet is encoded with a G-NVGRE-2 header. It will be appreciated that, although primarily presented herein as being performed serially, at least a portion of the functions of method 1900 may be performed contemporaneously or in a different order than as presented in FIG. 19. The inputs to the method 1900 include the VSID of an NVGRE overlay on which to send a packet and the packet to be sent on the NVGRE overlay. At block 1901, the method 1900 begins. Block 1902 looks up the configuration of the NVGRE overlay that matches the VSID, and then the method 1900 proceeds to block 1904. Block 1904 pushes the G-NVGRE-2 header onto the packet with VSID. The Protocol Type is configured with value 0x6572 to indicate the GRE header of type G-NVGRE-2. The FlowID field is encoded as per the flow-specific requirement of the packet. The Upper Layer Protocol Type field is encoded with the Ethertype value of the protocol associated with the input packet. From block 1904 the method 1900 proceeds to block 1906. Block 1906 pushes the IP header of the tunnel. In the IP header, the source address is configured with an IP address of the local overlay termination point and the destination address is configured with an IP address of the remote overlay termination point. If the IP header is IPv4, then the Protocol ID field is encoded as 47 (=GRE). If the IP header is IPv6, then the Next Header field is encoded as 47 (=GRE). From block 1906, the method 1900 then proceeds to block 1908. Block 1908 sends the IP packet on the underlay IP network. From block 1908, the method 1900 proceeds to block 1999 where the method 1900 ends. At block 1999, the method 1900 ends.

FIG. 20 depicts an example embodiment of a method for use by an NVGRE overlay termination point for receiving and processing an NVGRE overlay packet encoded with a G-NVGRE-2 header. It will be appreciated that, although primarily presented herein as being performed serially, at least a portion of the functions of method 2000 may be performed contemporaneously or in a different order than as presented in FIG. 20. The input to the method 2000 is an IP packet with a destination address as a local address of the IP underlay. At block 2001, the method 2000 begins. Block 2002 checks if the payload of the IP packet is GRE, which may be indicated by the Protocol ID field in the IPv4 Header as "47" or in the Next Header field in the IPv6 Header as "47" (although it will be appreciated that various other suitable values may be used to indicate the protocol type). If the payload of the IP packet is not GRE then the method 2000 proceeds to block 2018, otherwise the method 2000 proceeds to block 2004. Block 2018 handles the packet as per the non-GRE payload type and then the method 2000 proceeds to block 2099 where the method 2000 ends. Block 2004 checks if the value in the Protocol Type field in the GRE header indicates that the header is G-NVGRE-2 (e.g., if the value is 0x6572). If the value in the Protocol Type field in the GRE header does not indicate that the header is G-NVGRE-2 then the method 2000 proceeds to block 2020, otherwise the method 2000 proceeds to block 2006. Block 2020 processes the packet as the other kind of GRE packet and then the method 2000 proceeds to block 2099 where the method 2000 ends. Block 2006 looks up the NVGRE overlay configuration for the value in the VSID field of the G-NVGRE-2 header, and then the method 2000 proceeds to block 2008. Block 2008 checks if the NVGRE overlay configuration is found. If the NVGRE overlay configuration is not found then the method 2000 proceeds to block 2022, otherwise the method 2000 proceeds to block 2010. Block 2022 drops the packet and then the method 2000 proceeds to block 2099 where the method 2000 ends. Block 2010 reads and preserves the value in Upper Layer Protocol Type field of G-NVGRE-2 header as the Ethertype of the payload of G-NVGRE-2 header, and then the method 2000 proceeds to block 2012. Block 2012 pops the IP header from the packet, and then the method 2000 proceeds to block 2014. Block 2014 pops the G-NVGRE-2 header from the packet, and then the method 2000 proceeds to block 2016. Block 2016 sends the packet (which is now the payload packet on the overlay) to the forwarder for the Ethertype (preserved in block 2010) in the context of the overlay, and then the method 2000 proceeds to block 2099 where the method 2000 ends. At block 2099, the method 2000 ends.

Figure 21:
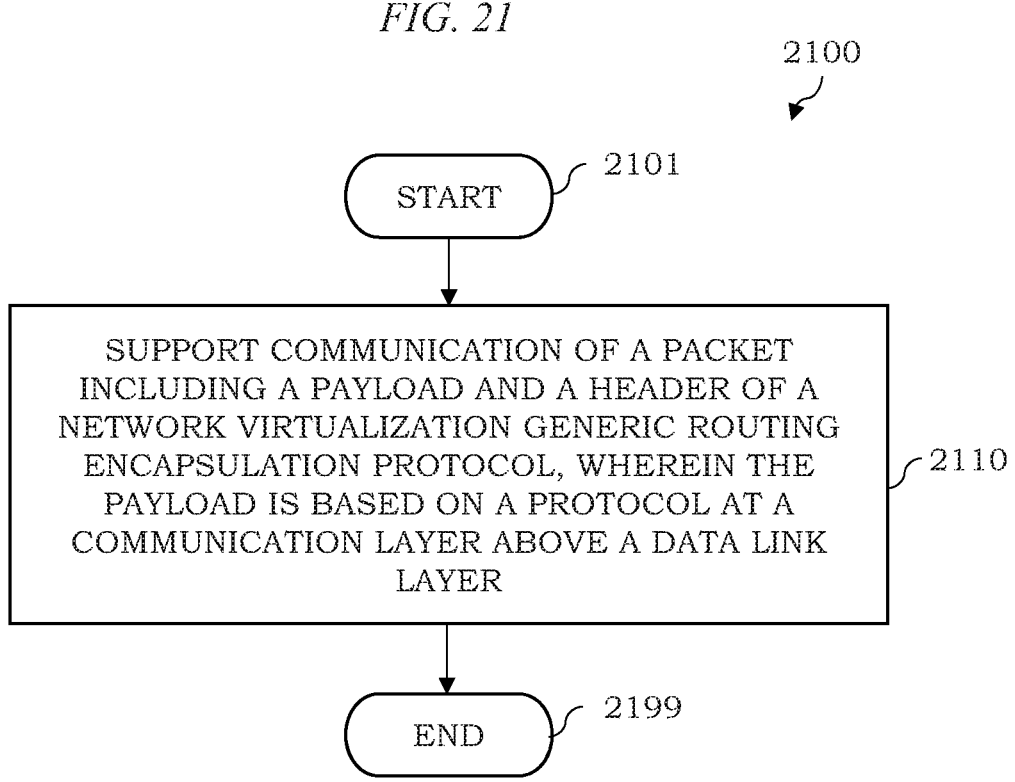
FIG. 21 depicts an example embodiment of a method for supporting transport of any protocol over network virtualization generic routing encapsulation.

FIG. 21 depicts an example embodiment of a method for supporting transport of any protocol over network virtualization. It will be appreciated that although primarily presented as being performed serially, at least a portion of the blocks of method 2100 may be performed contemporaneously or in a different order than as presented in FIG. 21. At block 2101, the method 2100 begins. At block 2110, support communication of a packet including a payload and a header of a network virtualization generic routing encapsulation protocol, wherein the payload is based on a protocol at a communication layer above a data link layer. The header may include a protocol type field, a virtual subnet identifier field, and a flow identifier field. The protocol at the communication layer above the data link layer may include a non-standard protocol of a networking stack. The protocol at the communication layer above the data link layer may include at least one of a switch fabric protocol or an inter-card communication protocol. The indication of the protocol at the communication layer above the data link layer may not be encoded within the header. The protocol at the communication layer above the data link layer may be negotiated using at least one of an out-of-band mechanism or a manual configuration operation. The header may include a protocol type field, a virtual subnet identifier field, a flow identifier field, and an upper layer protocol type field, where the upper layer protocol field may indicate a payload type of the payload. The protocol at the communication layer above the data link layer may include a standard protocol of a networking stack. The protocol at the communication layer above the data link layer may include at least one of IP, FC, Infiband, PCIe, or NVMe. The upper layer protocol type field may be configured to encode an indication of the protocol at the communication layer above the data link layer. The upper layer protocol type field may be configured to encode an Ethertype value of a payload protocol type of the protocol type field. The packet may further include a network layer header on top of the header of the network virtualization generic routing encapsulation protocol. The network layer header may be an IP header. The protocol type field in the IP header may include a value indicative of a GRE protocol. At block 2199, the method 2100 ends.

Figure 22:
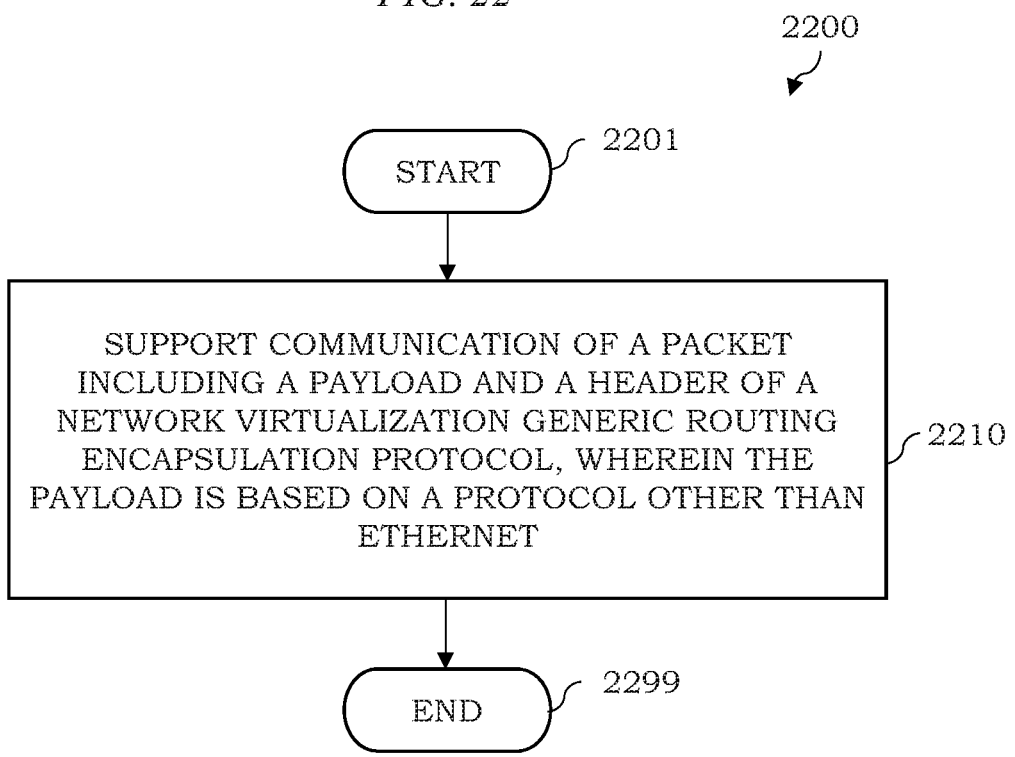
FIG. 22 depicts an example embodiment of a method for supporting transport of any protocol over network virtualization generic routing encapsulation.

FIG. 22 depicts an example embodiment of a method for supporting transport of any protocol over network virtualization. It will be appreciated that although primarily presented as being performed serially, at least a portion of the blocks of method 2200 may be performed contemporaneously or in a different order than as presented in FIG. 22. At block 2201, the method 2200 begins. At block 2210, support communication of a packet including a payload and a header of a network virtualization generic routing encapsulation protocol, wherein the payload is based on a protocol other than Ethernet. The protocol other than Ethernet may include a protocol of a networking stack (e.g., a physical layer protocol or a protocol operating at a physical layer, a data link layer protocol or a protocol operating at a data link layer, a network layer protocol or a protocol operating at a network layer, a transport layer protocol or a protocol operating at a transport layer, a session layer protocol or a protocol operating at a session layer, a presentation layer protocol or a protocol operating at a presentation layer, an application layer protocol or a protocol operating at an application layer, or the like, as well as various combinations thereof). The protocol other than Ethernet may include a custom protocol. The custom protocol may include at least one of a switch fabric protocol or an inter-card communication protocol. The indication of the protocol at the communication layer above the data link layer may not be encoded within the header. At block 2299, the method 2200 ends.

Various example embodiments for supporting transport of any protocol over network virtualization technology may provide various advantages or potential advantages. For example, various example embodiments for supporting transport of any protocol over network virtualization technology may be configured to extend a network virtualization generic routing encapsulation protocol (e.g., NVGRE or the like) to support transport of packets of any protocol over the network virtualization generic routing encapsulation protocol and, thus, to support virtualization of any type of network over the network virtualization generic routing encapsulation protocol. For example, various example embodiments for supporting transport of any protocol over network virtualization technology may be configured to support transport of any protocol within multi-tenant DCs (e.g., based on hypervisors that support enhanced NVGRE termination points configured to support transport of any protocol, based on Open vSwitches (OVSs)). Various example embodiments for supporting transport of any protocol over network virtualization technology may provide various other advantages or potential advantages.

Figure 23:
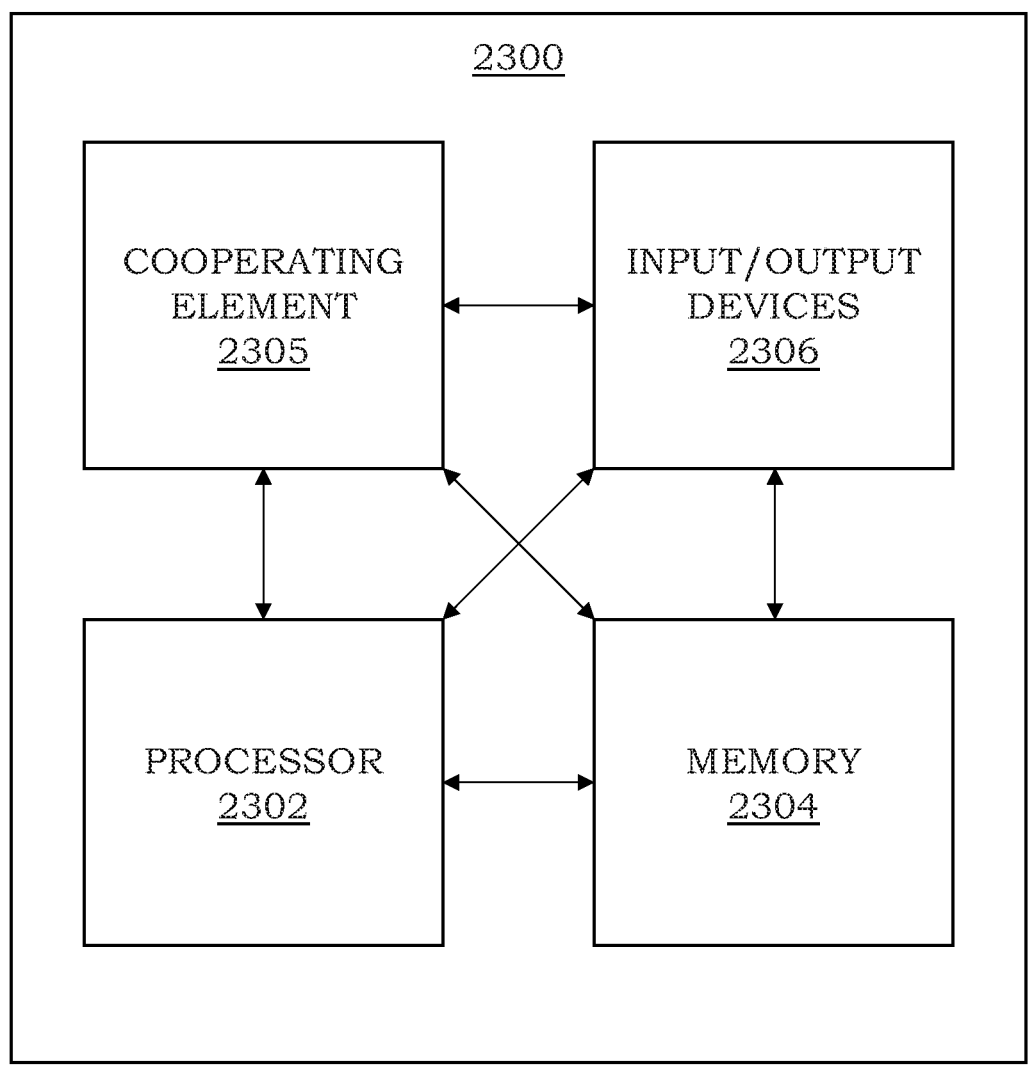
FIG. 23 depicts an embodiment of a computer suitable for use in performing various functions presented herein.

FIG. 23 depicts an example embodiment of a computer suitable for use in performing various functions presented herein.

The computer 2300 includes a processor 2302 (e.g., a central processing unit (CPU), a processor, a processor having a set of processor cores, a processor core of a processor, or the like) and a memory 2304 (e.g., a random access memory, a read only memory, or the like). The processor 2302 and the memory 2304 may be communicatively connected. In at least some example embodiments, the computer 2300 may include at least one processor and at least one memory including computer program code, wherein the at least one memory and the computer program code are configured to, with the at least one processor, cause the computer to perform various functions presented herein.

The computer 2300 also may include a cooperating element 2305. The cooperating element 2305 may be a hardware device. The cooperating element 2305 may be a process that can be loaded into the memory 2304 and executed by the processor 2302 to implement various functions presented herein (in which case, for example, the cooperating element 2305 (including associated data structures) can be stored on a non-transitory computer-readable storage medium, such as a storage device or other suitable type of storage element (e.g., a magnetic drive, an optical drive, or the like)).

The computer 2300 also may include one or more input/output devices 2306. The input/output devices 2306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2300 may represent a general architecture and functionality suitable for implementing functional elements described herein, portions of functional elements described herein, or the like, as well as various combinations thereof. For example, computer 2300 may provide a general architecture and functionality that is suitable for implementing one or more elements presented herein, such as a network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory storing instructions that, when executed by the at least one processor, cause the apparatus to:
support communication of a packet including a payload and a header of a network virtualization generic routing encapsulation protocol, wherein the payload is based on a protocol at a communication layer above a data link layer, wherein the header of the network virtualization generic routing encapsulation protocol includes a protocol type field, a virtual subnet identifier field, a flow identifier field, and an upper layer protocol type field, wherein the protocol type field includes an indication that any protocol may be included within the payload, wherein the upper layer protocol type field includes an indication of the protocol at the communication layer above the data link layer.

2. The apparatus of claim 1, wherein the protocol at the communication layer above the data link layer includes a standard protocol of a networking stack.

3. The apparatus of claim 1, wherein the protocol at the communication layer above the data link layer includes at least one of Internet Protocol (IP), Fibre Channel (FC), Infiband, Peripheral Component Interconnect Express (PCIe), or Non-Volatile Memory Express (NVMe).

4. The apparatus of claim 1, wherein the indication of the protocol at the communication layer above the data link layer is an Ethertype value of the protocol at the communication layer above the data link layer.

5. The apparatus of claim 1, wherein the packet further includes a network layer header on top of the header of the network virtualization generic routing encapsulation protocol.

6. The apparatus of claim 5, wherein the network layer header is an Internet Protocol (IP) header.

7. A method, comprising:
supporting communication of a packet including a payload and a header of a network virtualization generic routing encapsulation protocol, wherein the payload is based on a protocol at a communication layer above a data link layer, wherein the header of the network virtualization generic routing encapsulation protocol includes a protocol type field, a virtual subnet identifier field, a flow identifier field, and an upper layer protocol type field, wherein the protocol type field includes an indication that any protocol may be included within the payload, wherein the upper layer protocol type field includes an indication of the protocol at the communication layer above the data link layer.

8. An apparatus, comprising:
at least one processor; and
at least one memory storing instructions that, when executed by the at least one processor, to cause the apparatus to:
support communication of a packet including a payload and a header of a network virtualization generic routing encapsulation protocol encapsulating the payload, wherein the payload is based on a protocol, wherein the header of the network virtualization generic routing encapsulation protocol includes a protocol type field, a virtual subnet identifier field, a flow identifier field, and an upper layer protocol type field, wherein the upper layer protocol type field includes an indication of the protocol.

9. The apparatus of claim 8, wherein the protocol includes a standard protocol of a networking stack.

10. The apparatus of claim 8, wherein the protocol includes at least one of Internet Protocol (IP), Fibre Channel (FC), Infiband, Peripheral Component Interconnect Express (PCIe), or Non-Volatile Memory Express (NVMe).

11. The apparatus of claim 8, wherein the indication of the protocol is an Ethertype value of the protocol.

12. The apparatus of claim 8, wherein the packet further includes a network layer header on top of the header of the network virtualization generic routing encapsulation protocol.

13. The apparatus of claim 12, wherein the network layer header is an Internet Protocol (IP) header.

* * * * *

UNITED STATES PATENT AND TRADEMARK OFFICE
CERTIFICATE OF CORRECTION

PATENT NO. : 11,743,365 B2
APPLICATION NO. : 17/075378
DATED : August 29, 2023
INVENTOR(S) : Pranjal Kumar Dutta It is certified that error appears in the above-identified patent and that said Letters Patent is hereby corrected as shown below:

In the Claims

Claim 3; Column 26, Line 42: Delete "Infiband" and insert --infiniband--

Claim 10; Column 27, Line 20: Delete "Infiband" and insert --infiniband--

Signed and Sealed this
Fourth Day of June, 2024

Katherine Kelly Vidal
*Director of the United States Patent and Trademark Office*